(12) United States Patent
Yamada et al.

(10) Patent No.: US 8,306,768 B2
(45) Date of Patent: Nov. 6, 2012

(54) GAME APPARATUS AND COMPUTER-READABLE RECORDING MEDIUM RECORDING GAME PROGRAM FOR CONTROLLING ATTITUDE AND POSITION OF AN OBJECT IN A VIRTUAL SPACE

(75) Inventors: Yoichi Yamada, Kyoto (JP); Hidemaro Fujibayashi, Kyoto (JP); Eiji Aonuma, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 749 days.

(21) Appl. No.: 12/388,008

(22) Filed: Feb. 18, 2009

(65) Prior Publication Data

US 2010/0160045 A1 Jun. 24, 2010

(30) Foreign Application Priority Data

Dec. 22, 2008 (JP) ................................ 2008-325653

(51) Int. Cl.
G06F 19/00 (2011.01)
G01C 17/38 (2006.01)
(52) U.S. Cl. .............. 702/93; 702/85; 702/150; 463/31; 463/37; 463/43

(58) Field of Classification Search .................... 463/31, 463/37, 43; 702/93, 85, 150
See application file for complete search history.

(56) References Cited

U.S. PATENT DOCUMENTS

2007/0254738 A1* 11/2007 Sato ................................ 463/31
2009/0326847 A1* 12/2009 Ohta ............................... 702/93

FOREIGN PATENT DOCUMENTS

JP 2000-308756 11/2000

* cited by examiner

*Primary Examiner* — N Drew Richards
*Assistant Examiner* — John P Dulka
(74) *Attorney, Agent, or Firm* — Nixon & Vanderhye P.C.

(57) ABSTRACT

Operation data including at least acceleration data and angular speed data is obtained from an input device including at least an acceleration sensor and a gyroscopic sensor. Next, at least one of an attitude and a position of a predetermined object in a virtual space is controlled based on the angular speed data. When at least one of the attitude and the position of the predetermined object is controlled based on the angular speed data, it is determined whether or not the acceleration data satisfies predetermined conditions. As a result, if the acceleration data satisfies the predetermined conditions, the predetermined object is caused to start a predetermined motion.

14 Claims, 22 Drawing Sheets

F I G. 1
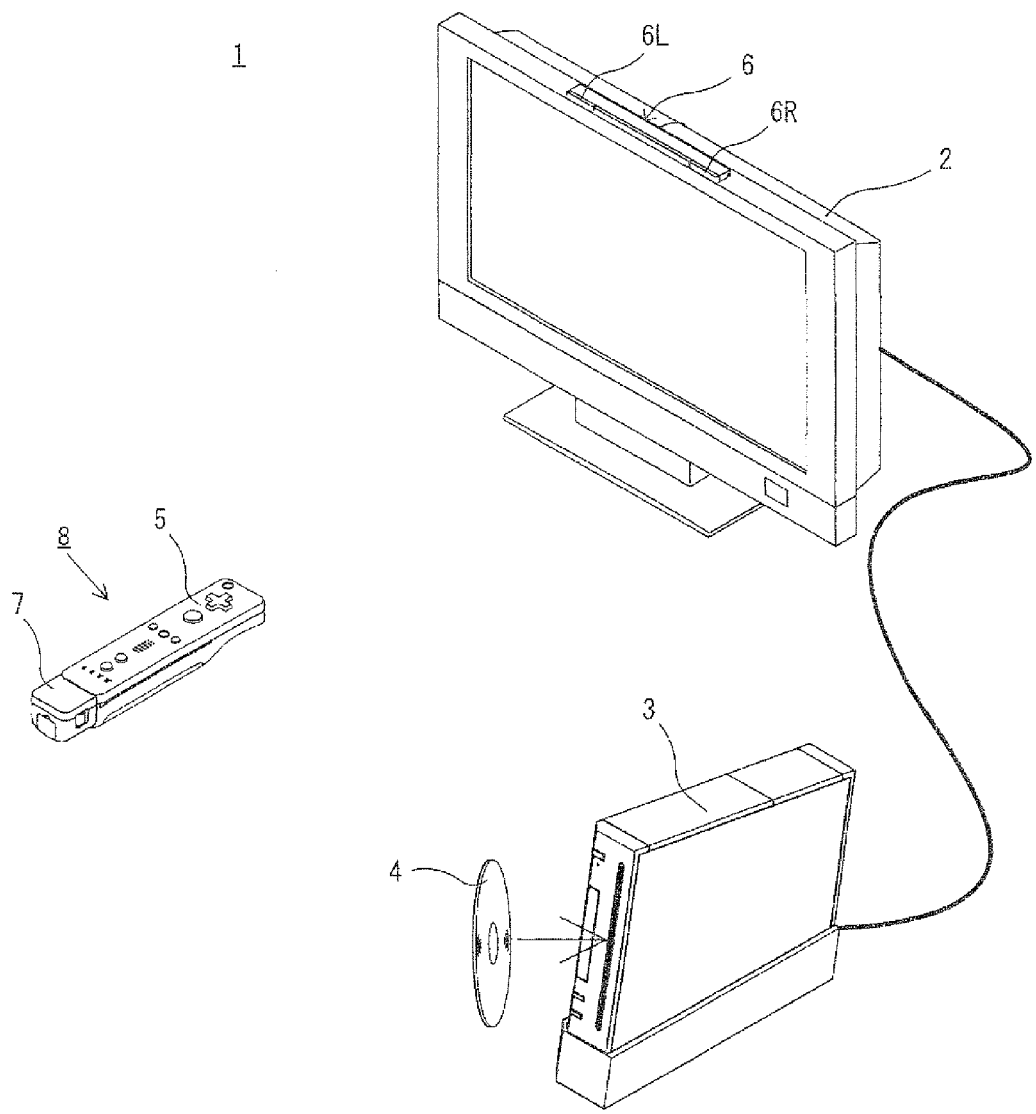

104  101  102  103

104  102

FIG. 14
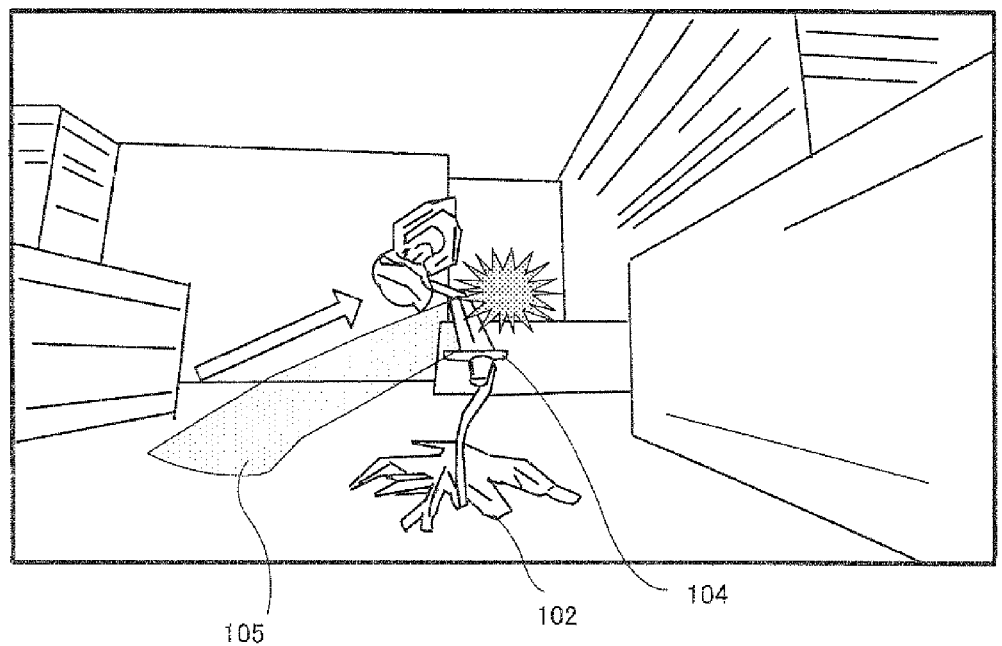
FIG. 15
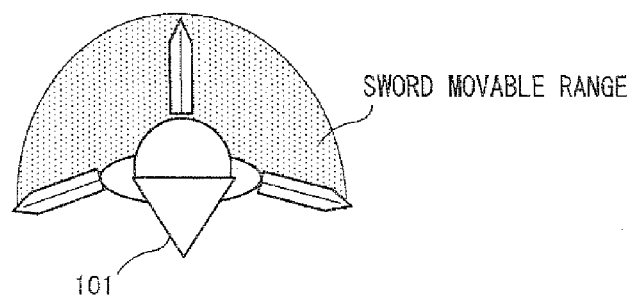
FIG. 16A    FIG. 16B    FIG. 16C
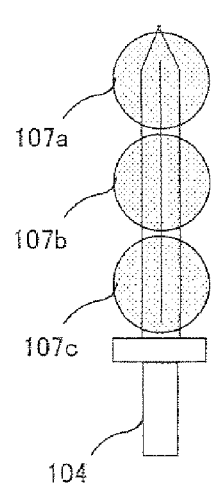   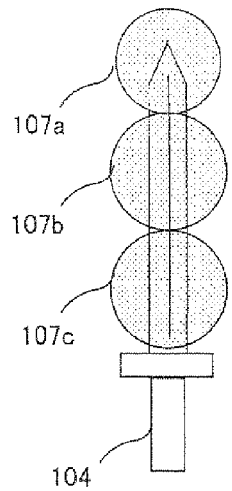   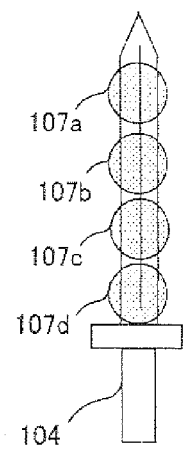

GAME APPARATUS AND COMPUTER-READABLE RECORDING MEDIUM RECORDING GAME PROGRAM FOR CONTROLLING ATTITUDE AND POSITION OF AN OBJECT IN A VIRTUAL SPACE

CROSS REFERENCE TO RELATED APPLICATION

The disclosure of Japanese Patent Application No. 2008-325653, filed December 22, is incorporated herein by reference.

BACKGROUND OF THE INVENTION

1. Field of the Invention

The present invention relates to a game apparatus and a computer-readable recording medium recording a game program which are used to execute a game utilizing a gyroscopic sensor and an acceleration sensor. More particularly, the present invention relates to a game apparatus and a computer-readable recording medium recording a game program which are used to detect a motion applied to an input device and reflect the detected motion on a game process.

2. Description of the Background Art

Conventionally, an input control device for a game apparatus is known that includes a gyroscopic sensor and an acceleration sensor (e.g., Japanese Patent Laid-Open Publication No 2000-308756). The input control device is in the shape of a bar, and is moved as if it were a sword. A game process is executed, depending on the motion. In this game process, data corresponding to a motion of the sword (i.e., an intensity, and forward, backward, leftward, rightward, upward and downward movements, etc.) is created based on an output of the acceleration sensor. Also, data corresponding to an attitude of the sword that is rotated (turned) or tilted forward, backward, leftward or rightward is created based on an output of the gyroscopic sensor. Based on the thus-created data, a movement of an object (in this case, a sword) in a game is displayed on a game screen of a monitor.

However, a game process employing an input control device as described above has the following problems. Firstly, each motion of the input control device is detected based on an output of only either the acceleration sensor or the gyroscopic sensor. In other words, a motion of a sword is detected based on only an output of the acceleration sensor, while an attitude of a sword is detected based on only an output of the gyroscopic sensor.

When a motion of a sword is detected based on only an output of the acceleration sensor, it is difficult to correctly detect a change in attitude of the input control device while it is moving. It is possible to calculate an attitude of the acceleration sensor at rest, assuming that an output of the sensor is a gravitational acceleration. However, when the sensor is moving, an acceleration due to a motion as well as the gravitational acceleration are added to the output of the sensor, and therefore, it is difficult to calculate the attitude. Also, since the direction of the gravitational acceleration is no longer available, it is even not difficult to determine the direction of a motion. Therefore, for example, when the input control device (sword) is moved downward on a zigzag path (see FIG. 31), then if an attitude of the input control device is changed at the turning points of the path, such a change cannot be detected. Therefore, in this case, it is no longer possible to determine the actual direction of the moving sword. In other words, a gesture of the player cannot be correctly represented as a motion of a sword.

SUMMARY OF THE INVENTION

Therefore, an object of the present invention is to provide a game apparatus employing both an acceleration sensor and a gyroscopic sensor in which a game can be executed by a novel control. Another object of the present invention is to provide a game apparatus employing both an acceleration sensor and a gyroscopic sensor in which an attitude of an input device moved by the player can be more correctly reflected on an attitude of an object in a game.

The present invention has the following features to attain the object mentioned above. Note that reference numerals, additional descriptions and the like inside parentheses in this section indicate correspondence to embodiments described below for the sake of easy understanding, and do not limit the present invention.

A first aspect of the present invention is directed to a game apparatus including an operation data obtaining means (10), a first control means (10), a first acceleration condition determining means (10), and a second control means (10). The operation data obtaining means obtains operation data including at least acceleration data and angular speed data from an input device including at least an acceleration sensor and a gyroscopic sensor. The first control means controls at least one of an attitude and a position of a predetermined object in a virtual space based on the angular speed data. The first acceleration condition determining means determines whether or not the acceleration data satisfies predetermined conditions when at least one of the attitude and the position of the predetermined object is controlled by the first control means. The second control means causes the predetermined object to start a predetermined motion when the first acceleration condition determining means determines that the acceleration data satisfies the predetermined conditions.

Thus, according to the first aspect, when the predetermined object is controlled based on the angular speed, then if an acceleration satisfying the predetermined conditions is detected, the predetermined object can be caused to start a predetermined motion. Thereby, a game having a novel operability can be provided.

In a second aspect based on the first aspect, the second control means causes the predetermined object to start the predetermined process with reference to at least one of the attitude and the position of the predetermined object when the acceleration data satisfies the predetermined conditions.

Thus, according to the second aspect, the player is allowed to start an operation of the predetermined object without feeling unnaturalness.

In a third aspect based on the first aspect, the second control means determines a moving direction of the predetermined object based on the acceleration data when it is determined that the acceleration data satisfies the predetermined conditions, and moves the predetermined object in the determined direction.

Thus, according to the third aspect, the predetermined object is caused to move without giving an unnatural impression to the player.

In a fourth aspect based on the first aspect, the game apparatus further includes an attitude updating means for updating the attitude of the predetermined object based on the angular speed data when the second control means moves the predetermined object.

Thus, according to the fourth aspect, an operation performed by the player with respect to the input device can be more correctly reflected on a motion of the predetermined object.

In a fifth aspect based on the first aspect, the first acceleration condition determining means determines whether or not a magnitude of an acceleration indicated by the acceleration data is larger than a first predetermined value, and when the magnitude of the acceleration indicated by the acceleration data is larger than the first predetermined value, determines that the acceleration data satisfies the predetermined conditions.

Thus, according to the fifth aspect, when the input device is moved at a high speed, the predetermined object can be caused to start a predetermined motion. Thereby, for example, a game in which the player mimics the motion of swinging a sword can be caused to be more enjoyable.

In a sixth aspect based on the first aspect, the second control means includes a strike determination area setting means for setting a strike determination area for determining whether or not the predetermined object collides with another object, when it is determined that the acceleration data satisfies the predetermined conditions.

In a seventh aspect based on the sixth aspect, the second control means includes a second acceleration condition determining means and a strike determination area erasing means. The second acceleration condition determining means for determining whether or not the acceleration indicated by the acceleration data is smaller than a second predetermined value after the strike determination area setting means sets the strike determination area. The strike determination area erasing means erases the strike determination area when the second acceleration condition determining means determines that the acceleration is smaller than the second predetermined value.

Thus, according to the sixth and seventh aspects, only when the input device is moved at a high speed, it is determined whether the predetermined object collides with another object. Therefore, an operability can be improved when the player moves the input device at a low speed.

In the eighth aspect based on the sixth aspect, the strike determination area setting means sets an effect provided when the strike determination area collides with the other object, based on the acceleration data.

Thus, according to the eighth aspect, an effect provided when the predetermined object collides with another object can be changed, depending on the acceleration, so that the game can be caused to be more enjoyable.

A ninth aspect of the present invention is directed to a computer-readable recording medium recording a game program for causing a computer of a game apparatus to function as an operation data obtaining means (S4), a first control means (S28, S29), a first acceleration condition determining means (S24), and a second control means (12). The operation data obtaining means obtains operation data including at least acceleration data and angular speed data from an input device including at least an acceleration sensor and a gyroscopic sensor. The first control means controls at least one of an attitude and a position of a predetermined object in a virtual space based on the angular speed data. The first acceleration condition determining means determines whether or not the acceleration data satisfies predetermined conditions when at least one of the attitude and the position of the predetermined object is controlled by the first control means. The second control means causes the predetermined object to start a predetermined motion when the first acceleration condition determining means determines that the acceleration data satisfies the predetermined conditions.

In a tenth aspect based on the ninth aspect, the second control means causes the predetermined object to start the predetermined process with reference to at least one of the attitude and the position of the predetermined object when the acceleration data satisfies the predetermined conditions.

In an eleventh aspect based on the ninth aspect, the second control means determines a moving direction of the predetermined object based on the acceleration data when it is determined that the acceleration data satisfies the predetermined conditions, and moves the predetermined object in the determined direction.

In a twelfth aspect based on the ninth aspect, the program causes the computer to further function as an attitude updating means for updating the attitude of the predetermined object based on the angular speed data when the second control means moves the predetermined object.

In a thirteenth aspect based on the ninth aspect, the first acceleration condition determining means determines whether or not a magnitude of an acceleration indicated by the acceleration data is larger than a first predetermined value, and when the magnitude of the acceleration indicated by the acceleration data is larger than the first predetermined value, determines that the acceleration data satisfies the predetermined conditions.

In a fourteenth aspect based on the ninth aspect, the second control means includes a strike determination area setting means for setting a strike determination area for determining whether or not the predetermined object collides with another object, when it is determined that the acceleration data satisfies the predetermined conditions.

In a fifteenth aspect based on the fourteenth aspect, the second control means includes a second acceleration condition determining means and a strike determination area erasing means. The second acceleration condition determining means determines whether or not the acceleration indicated by the acceleration data is smaller than a second predetermined value after the strike determination area setting means sets the strike determination area. The strike determination area erasing means erases the strike determination area when the second acceleration condition determining means determines that the acceleration is smaller than the second predetermined value.

In a sixteenth aspect based on the fourteenth aspect, the strike determination area setting means sets an effect provided when the strike determination area collides with the other object, based on the acceleration data.

Thus, according to the computer-readable recording medium recording the game program according to the present invention, effects similar to those of the game apparatus of the present invention can be obtained.

Thus, according to the present invention, a game having a novel operability in which both an acceleration sensor and a gyroscopic sensor are used, can be provided.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an external view of a game system 1 according to an embodiment of the present invention;

FIG. 14 is a diagram showing an exemplary game screen assumed in this embodiment;

FIG. 15 is a diagram showing an exemplary sword movable range;

FIGS. 16A to 16C are diagrams showing exemplary settings of strike determination spheres;

Figure 2:
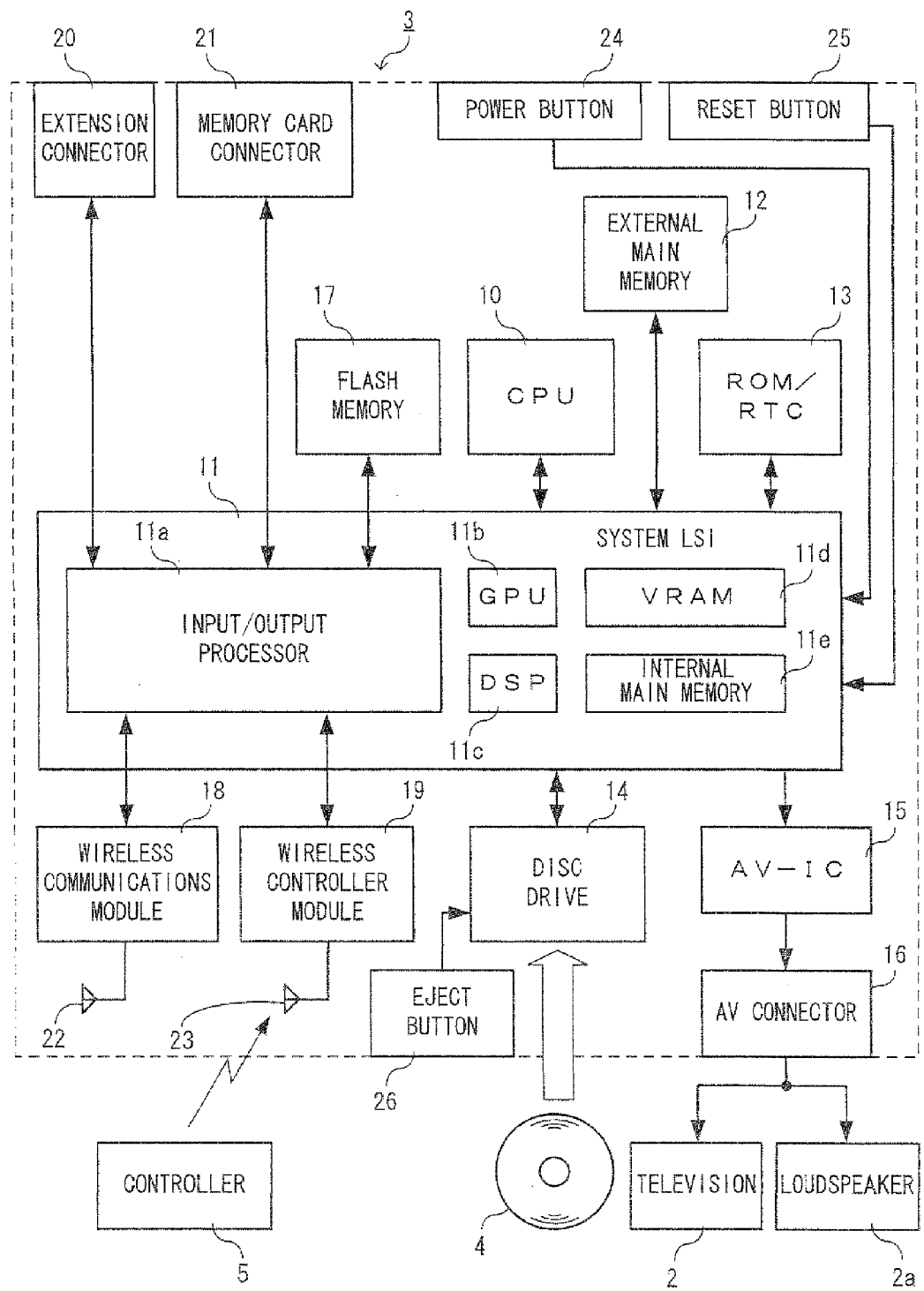
FIG. 2 is a functional block diagram of a game apparatus 3.

DESCRIPTION OF THE PREFERRED EMBODIMENTS (Whole Configuration of Game System)

A game system 1 including a game apparatus that is an attitude calculation device according to an embodiment of the present invention will be described with reference to FIG. 1. FIG. 1 is an external view of the game system 1. Hereinafter, the game apparatus of this embodiment and a game program will be described, where the game apparatus is a stationary game apparatus as an example. In FIG. 1, the game system 1 includes a television set (hereinafter simply referred to as a "television") 2, the game apparatus 3, an optical disc 4, an input device 8, and a marker unit 6. In the game system 1, the game apparatus 3 executes a game process based on a game operation using the input device 8.

The optical disc 4, which is an exemplary information storing medium changeable with respect to the game apparatus 3, is detachably loaded into the game apparatus 3. A game program that is executed in the game apparatus 3 is stored on the optical disc 4. On a front surface of the game apparatus 3, a slot through which the optical disc 4 is loaded or unloaded is provided. The game apparatus 3 executes a game process by reading and executing the game program stored on the optical disc 4 which has been loaded through the slot.

The television 2 as an exemplary display device is connected via a connection cord to the game apparatus 3. The television 2 displays a game image that is obtained as a result of the game process executed in the game apparatus 3. The maker unit 6 is provided in the vicinity of the screen of the television 2 (on an upper side of the screen in FIG. 1). The maker unit 6 comprises two markers 6R and 6L at both ends thereof. Specifically, the marker 6R is one or more infrared LEDs that output infrared light toward the front of the television 2 (the same is true of the marker 6L). The maker unit 6 is connected to the game apparatus 3, so that the game apparatus 3 can control ON/OFF of each infrared LED included in the maker unit 6.

The input device 8 is used to input, to the game apparatus 3, operation data indicating an operation that is performed with respect to the input device 8. In this embodiment, the input device 8 includes a controller 5 and a gyroscopic sensor unit 7. In the input device 8, the gyroscopic sensor unit 7 is detachably connected to the controller 5. The controller 5 and the game apparatus 3 are connected via wireless communication. In this embodiment, for example, the Bluetooth® technology is used for wireless communication between the controller 5 and the game apparatus 3. Note that, in other embodiments, the controller and the game apparatus 3 may be connected via wired communication.

(Internal Configuration of Game Apparatus 3)

Next, an internal configuration of the game apparatus 3 will be described with reference to FIG. 2. Note that FIG. 2 is a block diagram showing the configuration of the game apparatus 3. The game apparatus 3 has a CPU 10, a system LSI 11, an external main memory 12, a ROM/RTC 13, a disc drive 14, an AV-IC 15, and the like.

The CPU 10 executes a game process by executing a game program stored on the optical disc 4, and serves as a game processor. The CPU 10 is connected to the system LSI 11. In addition to the CPU 10, the external main memory 12, the ROM/RTC 13, the disc drive 14, and the AV-IC 15 are connected to the system. LSI 11. The system LSI 11 controls data transfer between each part connected thereto, generation of an image to be displayed, acquisition of data from an external apparatus, and the like. An internal configuration of the system LSI 11 will be described below. The volatile external main memory 12 stores a program, such as a game program read out from the optical disc 4, a game program read out from a flash memory 17, or the like, or stores various data, i.e., is used as a work area or a buffer area of the CPU 10. The ROM/RTC 13 has a ROM (so-called boot ROM) that stores a boot program for starting up the game apparatus 3, and a clock circuit (RTC: Real Time Clock) that counts time. The disc drive 14 reads out program data, texture data or the like from the optical disc 4, and writes the read data into an internal main memory 11e or the external main memory 12.

The system LSI 11 also comprises an input/output (I/O) processor 11a, a GPU (Graphics Processor Unit) 11b, a DSP (Digital Signal Processor) 11c, a VRAM 11d, and the internal main memory 11e. The parts 11a to 11e are interconnected via an internal bus (not shown).

The GPU 11b, which is a part of a drawing means, generates an image in accordance with a graphics command (drawing instruction) from the CPU 10. The VRAM 11d stores data (polygon data, texture data, etc.) required for the GPU 11b to execute the graphics command. When an image is generated, the GPO 11b produces image data using data stored in the VRAM 11d.

The DSP 11c, which functions as an audio processor, generates audio data using sound data or sound waveform (tone color) data stored in the internal main memory 11e or the external main memory 12.

The image data and audio data thus generated are read out by the AV-IC 15. The AV-IC 15 outputs the read image data via an AV connector 16 to the television 2 and the read audio data to a loudspeaker 2a included in the television 2. Thereby, sound is output from the loudspeaker 2a while an image is displayed on the television 2.

The input/output processor 11a transmits and receives data to and from parts connected thereto, and also downloads data from an external apparatus. The input/output processor 11e is connected to the flash memory 17, a wireless communications module 18, a wireless controller module 19, an extension connector 20, and a memory card connector 21. An antenna 22 is connected to the wireless communications module 18, and an antenna 23 is connected to the wireless controller module 19.

The input/output processor 11a is connected via the wireless communications module 18 and the antenna 22 to a network, which allows the input/output processor 11a to communicate with other game apparatuses or other servers connected to the network. The input/output processor 11a regularly accesses the flash memory 17 to detect the presence or absence of data that needs to be transmitted to the network, and when such data is present, outputs the data via the wireless communications module 18 and the antenna 22 to the network. The input/output processor 11a also receives data transmitted from another game apparatus or data downloaded from a download server, via the network, the antenna 22 and the wireless communications module 18, and stores the received data into the flash memory 17. The CPU 10 executes a game program to read out data from the flash memory 17 and uses the data in the game program. In the flash memory 17, save data (result data or intermediate data of a game) of a game that a user plays using the game apparatus 3 may be stored in addition to data that the game apparatus 3 transmits and receives to and from other game apparatuses or other servers.

The input/output processor 11a also receives operation data transmitted from the controller 5, via the antenna 23 and the wireless controller module 19, and stores (temporarily stores) the data into a buffer area of the internal main memory 11e or the external main memory 12.

Further, the extension connector 20 and the memory card connector 21 are connected to the input/output processor 11a. The extension connector 20 is a connector for interface, such as USB or SCSI, to which a medium (an external storage medium, etc.), a peripheral apparatus (another controller, etc.), or a wired communications connector may be connected. Communication with the network can be achieved via the wired communications connector instead of the wireless communications module 18. The memory card connector 21 is a connector for connecting an external storage medium, such as a memory card or the like. For example, the input/output processor 11a can access an external storage medium via the extension connector 20 or the memory card connector 21 to save data into or read data from the external storage medium.

The game apparatus 3 comprises a power button 24, a reset button 25, and an eject button 26. The power button 24 and the reset button 25 are connected to the system LSI 11. When the power button 24 is turned ON, power is supplied via an AC adaptor (not shown) to each part of the game apparatus 3. When the reset button 25 is pressed, the system LSI 11 restarts up the boot program of the game apparatus 3. The eject button 26 is connected to the disc drive 14. When the eject button 26 is pressed, the optical disc 4 is ejected from the disc drive 14.

(Configuration of Input Device 8)

Figure 3:
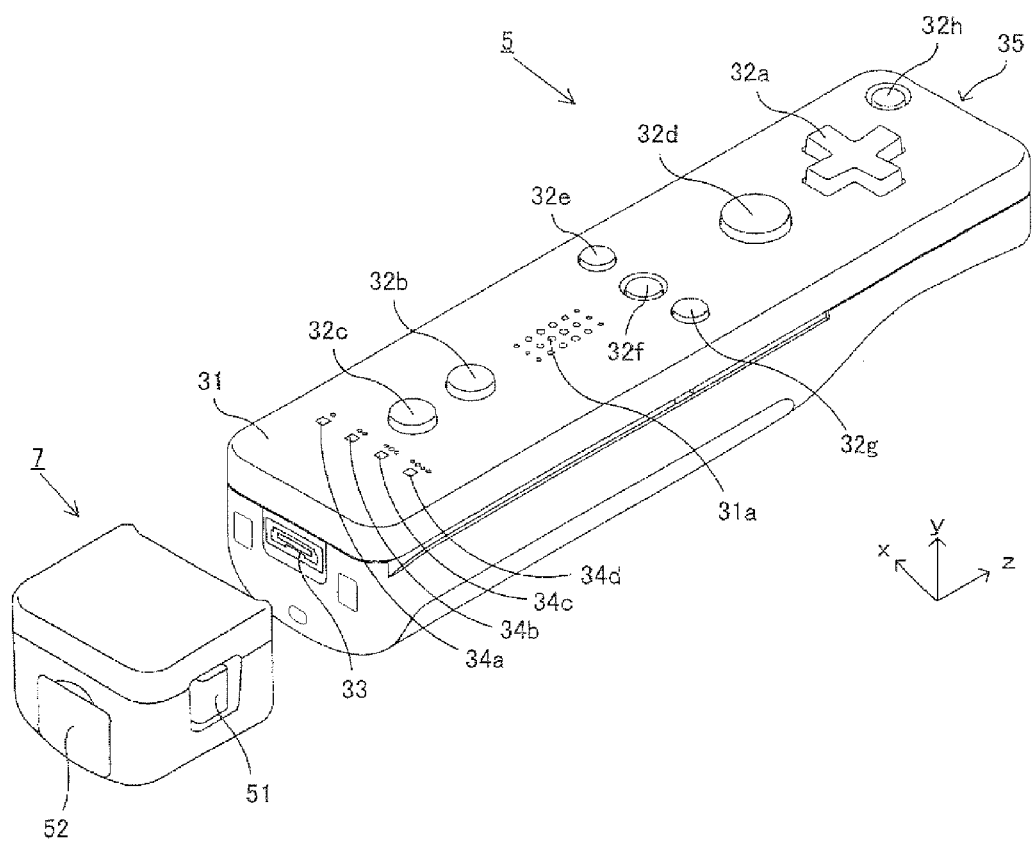
FIG. 3 is a perspective view of a controller 5 (input device 8) of FIG. 1 as viewed from the top and the rear.
Figure 4:
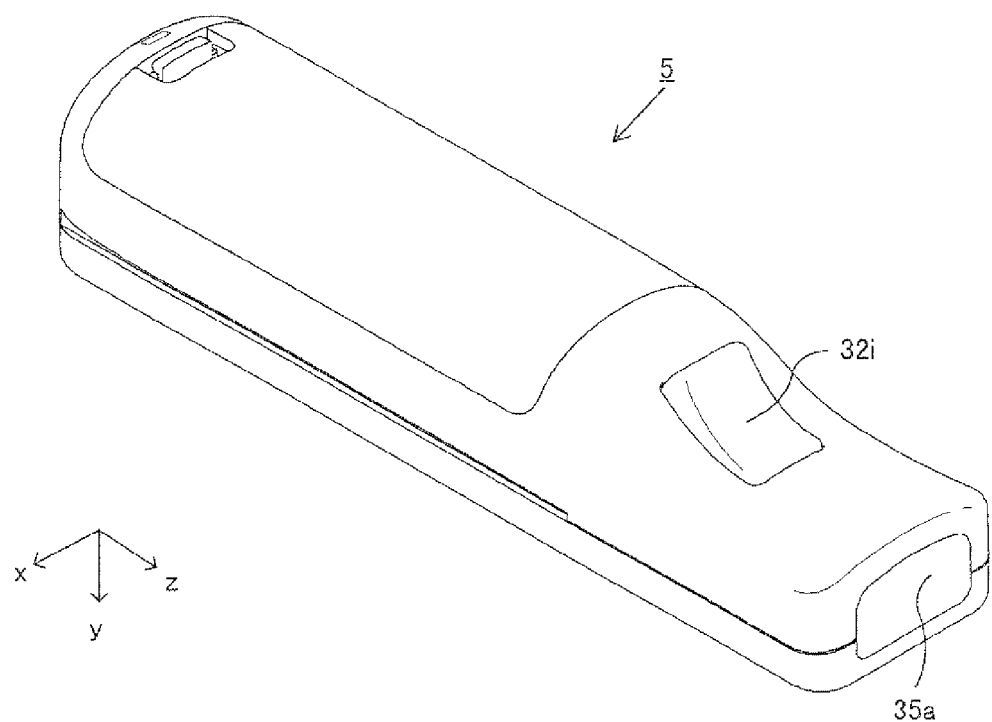
FIG. 4 is a perspective view of the controller 5 as viewed from the bottom and the front.

Next, the input device 8 will be described with reference to FIGS. 3 to 6. FIG. 3 is a perspective view showing an external appearance or configuration of the input device 8. FIG. 4 is a perspective view showing an external appearance or configuration of the controller 5. FIG. 3 is a perspective view of the controller 5 as viewed from the top and the rear. FIG. 4 is a perspective view of the controller 5 as viewed from the bottom and the front.

In FIGS. 3 and 4, the controller 5 has a housing 31 which is formed by, for example, plastic molding. The housing 31 is in the shape of substantially a rectangular parallelepiped where a front-rear direction (the z-axis direction in FIG. 3) is a longitudinal direction. The whole housing 31 has a size that enables an adult and a child to hold the controller 5 with one hand. A player performs a game operation by pressing down a button provided on the controller 5, and moving the controller 5 itself to change a position or an attitude of the controller 5.

The housing 31 is provided with a plurality of operation buttons. As illustrated in FIG. 3, a cross button 32a, a first button 32b, a second button 32c, an A-button 32d, a minus button 32e, a home button 32f, a plus button 32g, and a power button 32h are provided on an upper surface of the housing 31. The upper surface of the housing 31 on which these buttons 32a to 32h are provided may be referred to as a "button surface". On the other hand, as illustrated in FIG. 4, a hollow portion is formed on a lower surface of the housing 31. A B-button 32i is provided on a rear slope surface of the hollow portion. These operation buttons 32a to 32i are assigned respective functions depending on a game program executed by the game apparatus 3 as appropriate. The power button 32h is used to remotely power ON/OFF the main body of the game apparatus 3. Upper surfaces of the home button 32f and the power button 32h are buried below the upper surface of the housing 31. Thereby, the player is prevented from unintentionally and erroneously pressing down the home button 32f and the power button 32h.

A connector 33 is provided on a rear surface of the housing 31. The connector 33 is used to connect the controller 5 with other devices (e.g., a gyroscopic sensor unit 7, another controller, etc.). An engaging hole 33a is provided in both sides of the connector 33 in the rear surface of the housing 31 so as to prevent the other device from being easily detached from the housing 31.

A plurality of LEDs 34a to 34d (four LEDs in FIG. 3) are provided at a rear portion of the upper surface of the housing 31. Here, the controller 5 is assigned controller identification (number) so as to distinguish it from other controllers. The LEDs 34a to 34d are used so as to notify the player of the controller identification currently set for the controller 5, the state of charge of a battery in the controller 5, or the like. Specifically, when a game operation is performed using the controller 5, any one of the LEDs 34a to 34d is turned ON, depending on the controller identification.

Figure 6:
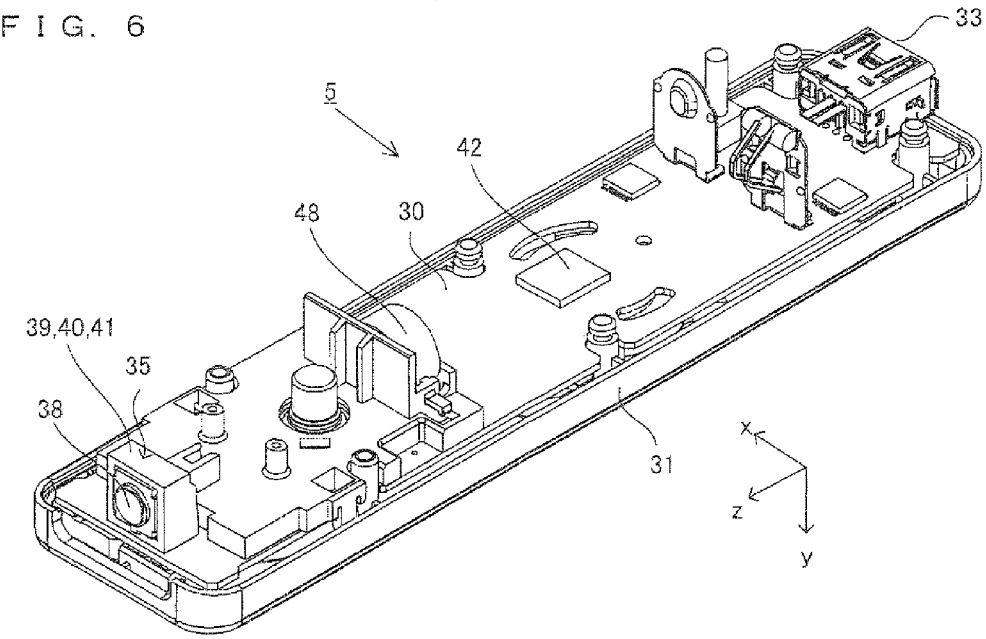
FIG. 6 is a perspective view of the controller 5 of FIG. 3 where a lower housing thereof is removed.

The controller 5 has an image capture information computing section 35 (FIG. 6). As illustrated in FIG. 4, a light incident surface 35a for the image capture information computing section 35 is provided on a front surface of the housing 31. The light incident surface 35a is made of a material that can transmit at least infrared light from the markers 6R and 6L.

Also, sound holes 31a through which sound from a loudspeaker 49 (FIG. 5) included in the controller 5 is emitted to the outside, are formed between the first button 32b and the home button 32f on the upper surface of the housing 31.

Figure 5:
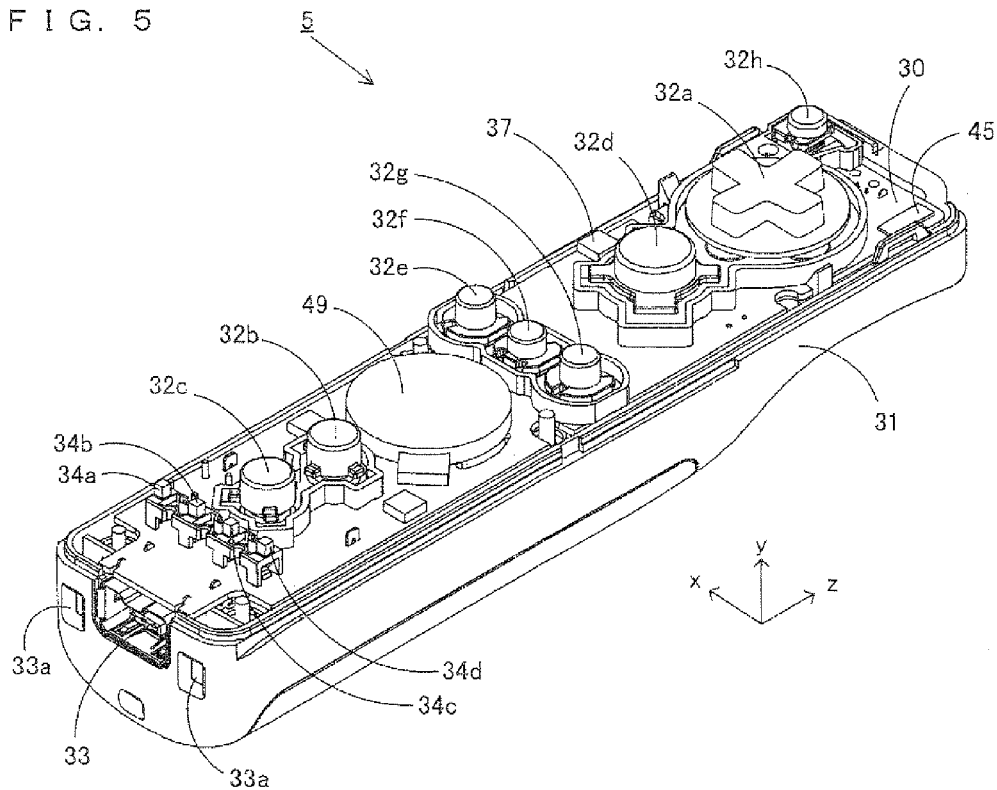
FIG. 5 is a perspective view of the controller 5 of FIG. 3 where an upper housing thereof is removed.

Next, an internal structure of the controller 5 will be described with reference to FIGS. 5 and 6. FIGS. 5 and 6 are diagrams showing the internal structure of the controller 5. Note that FIG. 5 is a perspective view of the controller 5 where an upper housing (a portion of the housing 31) is removed. FIG. 6 is a perspective view of the controller 5 where a lower housing (a portion of the housing 31) is removed. FIG. 6 illustrates a perspective view of a base board 30 of FIG. 5 as viewed from a bottom surface thereof.

In FIG. 5, the base board 30 is fixed inside the housing 31. On an upper major surface of the base board 30, the operation buttons 32a to 32h, the LEDs 34a to 34d, an acceleration sensor 37, an antenna 45, the loudspeaker 49, and the like are provided. These are connected to a microcomputer 42 (see FIG. 6) via conductors (not shown) formed on the base board 30 and the like. In this embodiment, the acceleration sensor 37 is positioned away from a center of the controller 5 in the x-axis direction, thereby facilitating calculation of a motion of the controller 5 when the controller 5 is rotated about the z axis. The acceleration sensor 37 is provided farther forward than the center of the controller 5 in the longitudinal direction (z-axis direction). A radio module 44 (FIG. 6) and the antenna 45 enable the controller 5 to function as a wireless controller.

On the other hand, in FIG. 6, the image capture information computing section 35 is provided at a front edge on a lower major surface of the base board 30. The image capture information computing section 35 comprises an infrared filter 38, a lens 39, an image capturing device 40, and an image processing circuit 41, which are arranged in this order from the front of the controller 5. These members 38 to 41 are attached on the lower major surface of the base board 30.

The microcomputer 42 and a vibrator 48 are provided on the lower major surface of the base board 30. The vibrator 48 may be, for example, a vibration motor or a solenoid. The vibrator 48 is connected to the microcomputer 42 via a conductor formed on the base board 30 and the like. The activation of the vibrator 48, which is instructed by the microcomputer 42, generates vibration in the controller 5. Thereby, the vibration is transferred to a user's hand holding the controller 5, thereby making it possible to achieve a so-called vibration-feature supporting game. In this embodiment, the vibrator 48 is disposed somehow closer to the front of the housing 31, i.e., the vibrator 48 is placed closer to the end of the controller 5 than the center of the controller 5 is. Therefore, the vibration of the vibrator 48 significantly vibrates the whole controller 5. The connector 33 is attached to a rear edge on the major lower surface of the base board 30. Note that, in addition to the parts of FIGS. 5 and 6, the controller 5 comprises a quartz oscillator for generating a basic clock for the microcomputer 42, an amplifier for outputting an audio signal to the loudspeaker 49, and the like.

Figure 7A:
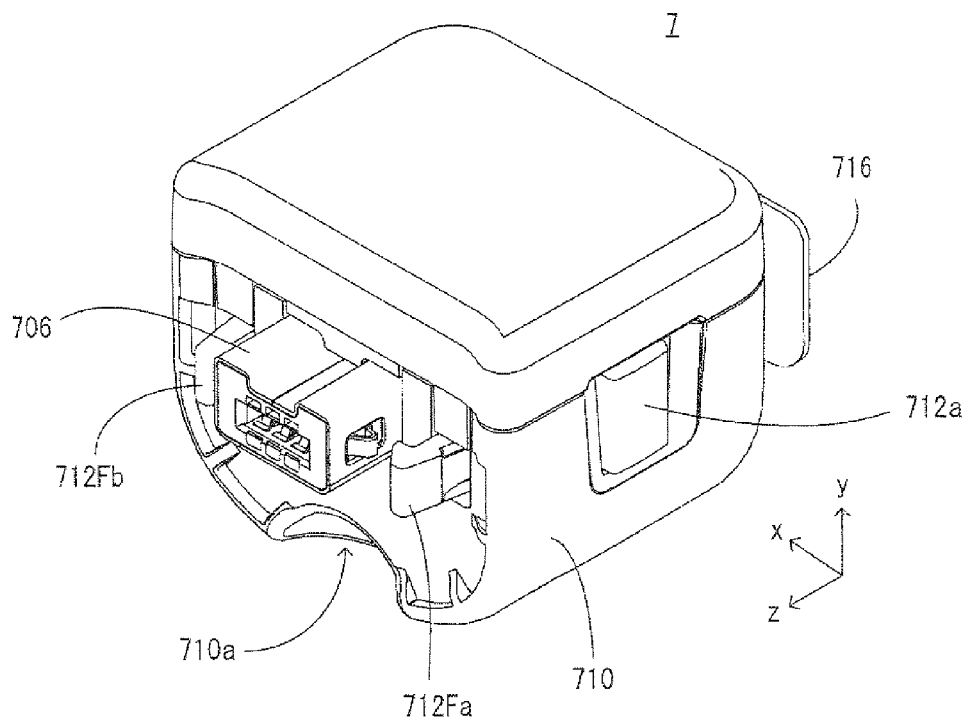
FIGS. 7A and 7B are diagrams showing outer appearances of a gyroscopic sensor unit 7 applied to this embodiment.
Figure 7B:
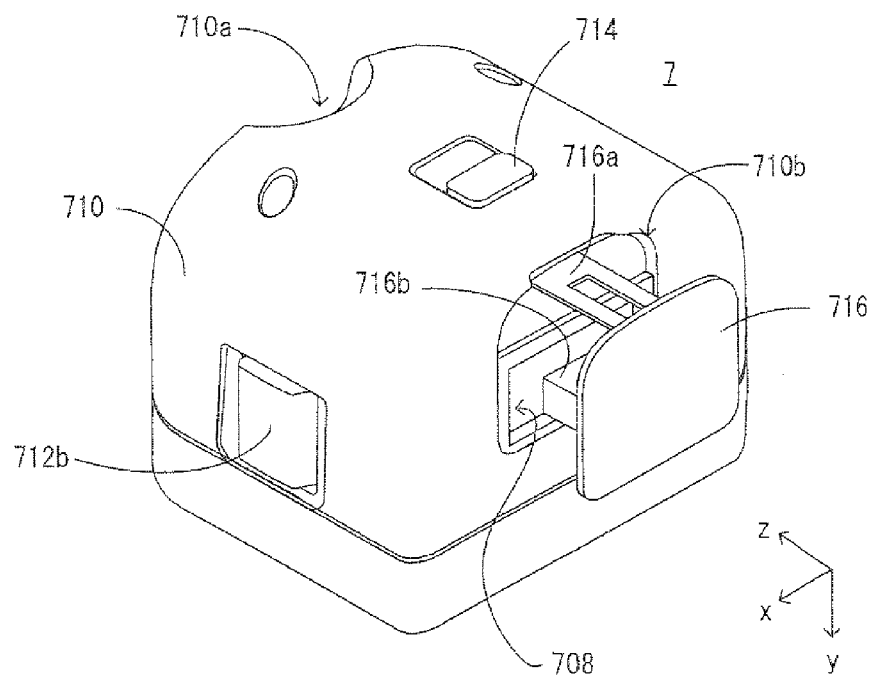

Next, a gyroscopic sensor unit 7 will be described with reference to FIGS. 7A to 10. FIGS. 7A and 7B show exemplary outer appearances of the gyroscopic sensor unit 7. FIG. 7A is a perspective view of the gyroscopic sensor unit 7 as viewed from the top and the front, while FIG. 7B is a perspective view of the gyroscopic sensor unit 7 as viewed from the bottom and the rear.

The gyroscopic sensor unit 7 has a housing 710 formed by plastic molding. The housing 710 is in the shape of substantially a rectangular parallelepiped, where its length is about ⅕ of the length of the housing 31 of the controller 5, and its width and thickness are almost the same as those of the housing 31. Even when the gyroscopic sensor unit 7 is attached to the controller 5, the player can perform a game operation by changing the position or orientation of the controller 5 itself.

Connectors 706 and 708 are provided on a front surface and a rear surface of the housing 710. A pair of release buttons 712a and 712b is provided on both side surfaces of the housing 710. A lock switch 714 is provided on a bottom surface of the housing 710. A concave portion 710a having substantially a spherical surface is provided, extending from a lower edge of the front surface to a front edge of the bottom surface of the housing 710. The concave portion 710a allows a hole 48c for a strap (not shown) to be exposed while the gyroscopic sensor unit 7 is attached to the controller 5 (FIG. 8).

A pair of hooks 712Fa and 712Fb is provided at positions on the front surface of the housing 710, facing each other in a lateral direction (x-axis direction) with the connector 706 being interposed therebetween. The hooks 712Fa and 712Fb are to be engaged with the release buttons 712a and 712b, respectively. When the connector 706 is connected to the connector 33 so as to attach the gyroscopic sensor unit 7 to the controller 5, the hooks 712Fa and 712Fb are inserted into a pair of holes 33a (FIG. 3) on the rear surface of the housing 31, so that the claws of the hooks 712Fa and 712Fb hang on an inner wall of the housing 31. Thereby, the gyroscopic sensor unit 7 is fastened to the rear surface of the controller 5.

Figure 8:
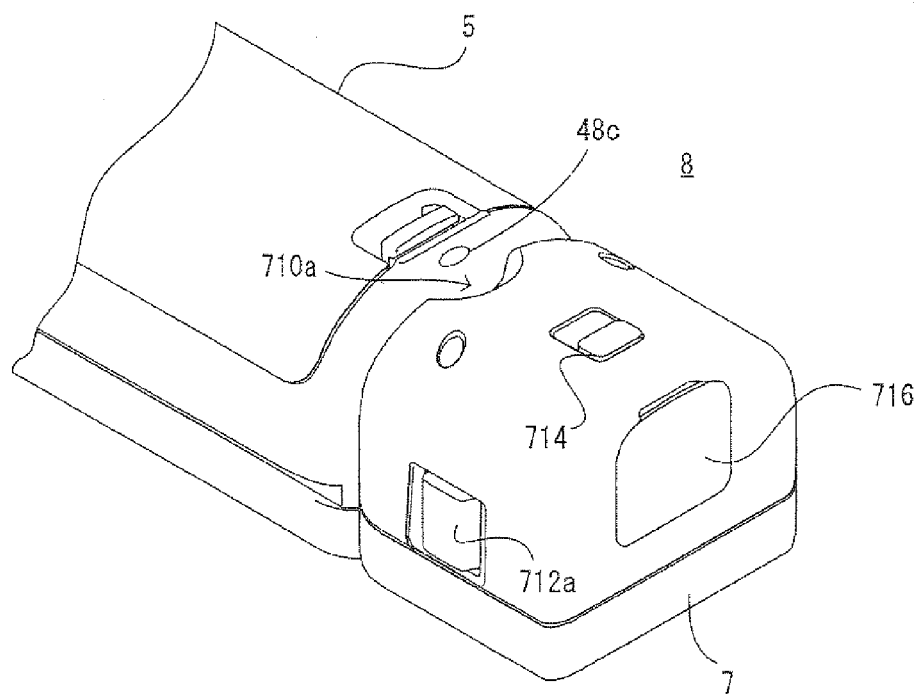
FIG. 8 is a diagram showing the gyroscopic sensor unit 7 attached to the controller 5.

The gyroscopic sensor unit 7 thus attached to the controller 5 is shown in FIG. 8. In this state, if the release button pair 712a and 712b is pressed, the claws are released, so that the gyroscopic sensor unit 7 can be detached from the controller 5.

The lock switch 714 is a sliding switch for locking the release buttons 712a and 712b. The release buttons 712a and 712b cannot be pressed down when the lock switch 714 is at a first position (e.g., closer to the rear) (locked state), and can be pressed down when the lock switch 714 is at a second position (e.g., closer to the front) (released state). Lock springs 718a and 718b (FIG. 10) are provided in the housing 710, and are arranged so that if the release buttons 712a and 712b are pressed down, the lock springs 718a and 718b push away the release buttons 712a and 712b, and if the release buttons 712a and 712b are not pressed down, the claws are caused to remain hanging on the inner wall of the housing 31. Therefore, in order to detach the gyroscopic sensor unit 7, the user needs to press the release buttons 712a and 712b after sliding the lock switch 714 from the first position to the second position.

Since the gyroscopic sensor unit 7 is thus attached to the rear surface of the controller 5, centrifugal force applied to the gyroscopic sensor unit 7 during a game operation exclusively acts to push the gyroscopic sensor unit 7 against the controller 5. Also, the gyroscopic sensor unit 7 is fastened to the rear surface of the controller 5 using the hooks 712Fa and 712Fb, while the lock switch 714 is provided for the release buttons 712a and 712b for releasing the hooks 712Fa and 712Fb. Therefore, the gyroscopic sensor unit 7 can be fastened to the controller 5.

A concave portion 710b that can accommodate a connector cover 716 that is attached to the connector 708 is provided around the connector 708 on the rear surface of the housing 710. The connector cover 716 has a thin and elongated (i.e., bendable) protrusion 716a extending in a front-rear direction (z-axis direction) at an end portion of a major surface thereof. A tip portion of the protrusion 716a is engaged with the housing 710, so that the connector cover 716 remains linked with the housing 710 even when the connector cover 716 is removed from the connector 708.

Figure 9:
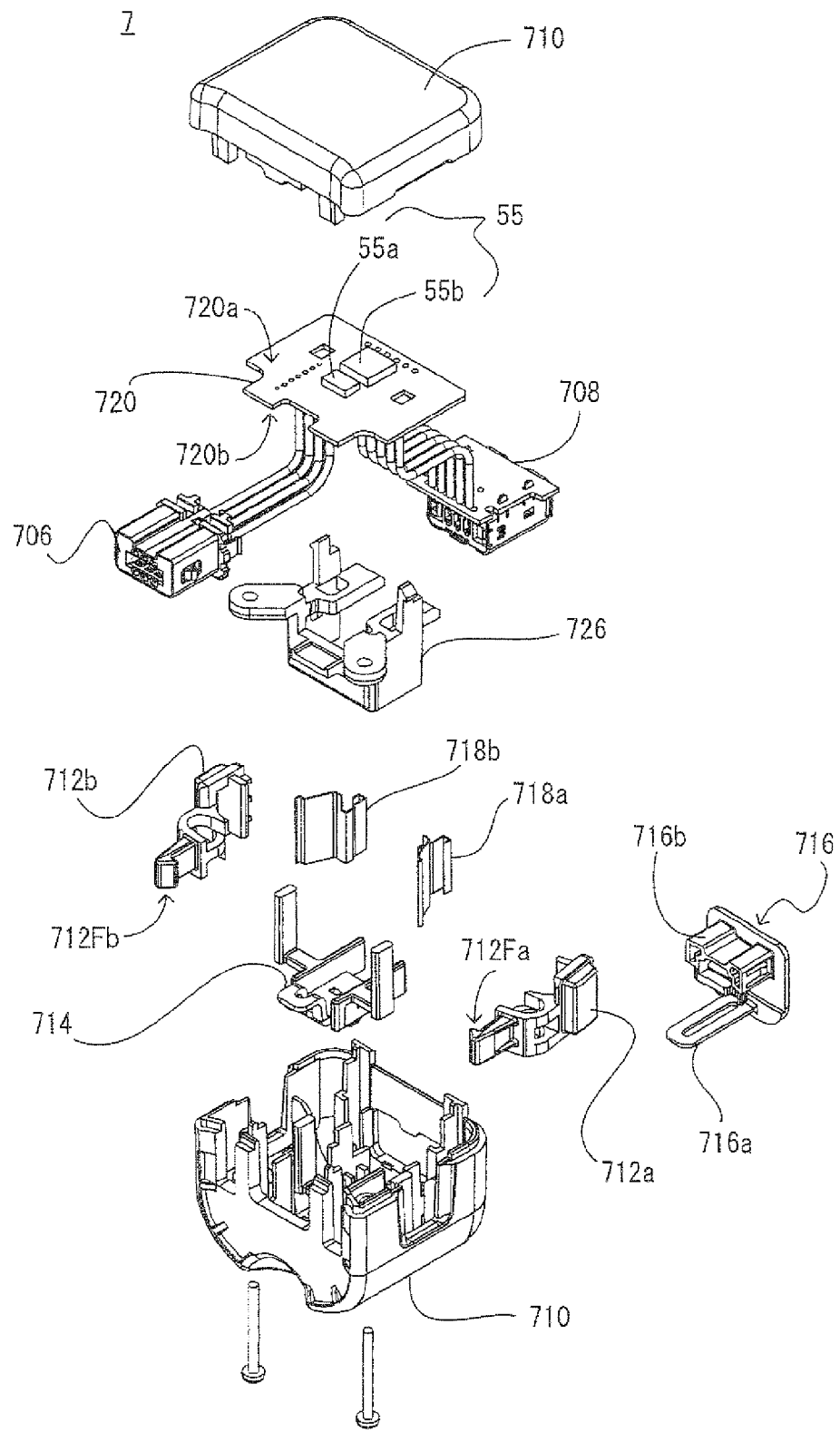
FIG. 9 is an exploded diagram showing a configuration of the gyroscopic sensor unit 7.

FIG. 9 shows an exemplary configuration of the gyroscopic sensor unit 7. The gyroscopic sensor unit 7 includes the housing 710, the connectors 706 and 708, the release buttons 712a and 712b, the hooks 712Fa and 712Fb, the lock switch 714, the connector cover 716 and the lock springs 718a and 718b described above, and in addition, a gyro substrate 720 and a support 726. The gyro substrate 720 is connected to the connectors 706 and 708 via a signal line. The support 726 supports the gyro substrate 720 and the connectors 706 and 708.

Figure 10:
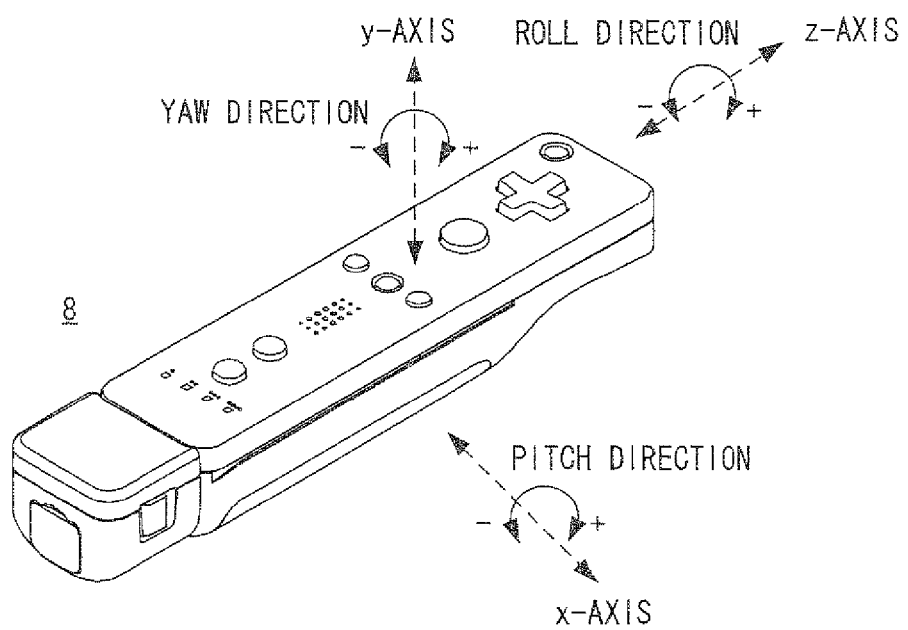
FIG. 10 is a diagram showing a yaw angle, a pitch angle, and a roll angle that can be detected by a gyroscopic sensor.

A gyroscopic sensor 55 is provided on the gyro substrate 720. The gyroscopic sensor 55 includes a one-axis gyroscopic sensor 55a and a two-axis gyroscopic sensor 55b (two separate chips). The gyroscopic sensor 55a is used to detect an angular speed (per unit time) related to a yaw angle (an angular speed about the y-axis). The gyroscopic sensor 55b is used to detect two angular speeds (per unit time) related to a roll angle and a pitch angle (an angular speed about the z-axis and an angular speed about the x-axis). The gyroscopic sensors 55a and 55b are provided and arranged horizontally side by side on an upper surface 720a of the gyro substrate 720. Note that directions of rotation about the x-, y- and z-axes are herein referred to as a "pitch direction", a "yaw direction" and a "roll direction" as shown in FIG. 10, where the shooting direction of the controller 5 (the positive direction of the z-axis) is a reference.

Note that the arrangement of the gyroscopic sensors 55a and 55b is not limited to that of FIG. 9. In another example, the gyroscopic sensor 55a is horizontally provided on one of the upper surface 720a and a lower surface 720b of the gyro substrate 720, while the gyroscopic sensor 55b is horizontally provided on the other of the upper surface 720a and the lower surface 720b of the gyro substrate 720, where the gyroscopic sensor 55a and the gyroscopic sensor 55b face each other with the gyro substrate 720 being interposed therebetween. In a still another example, the gyroscopic sensor 55a is vertically provided on one of the upper surface 720a and the lower surface 720b of the gyro substrate 720, while the gyroscopic sensor 55b is horizontally provided on the other of the upper surface 720a and the lower surface 720b of the gyro substrate 720.

Also, the gyroscopic sensor 55 is not limited to the two-chip configuration, and may be composed of three one-axis gyroscopic sensors (three chips) or a single three-axis gyroscopic sensor (one chip). In either case, the positions and orientations of these chips are determined so that the aforementioned three angular speeds can be appropriately detected. Moreover, in some cases, the gyroscopic sensor 55 may be composed of a single two-axis gyroscopic sensor, or alternatively, two or one one-axis gyroscopic sensor.

Note that the whole shape of the controller 5 of FIG. 3 and the whole shape of the gyroscopic sensor unit 7 of FIG. 7, and the shapes, numbers, positions and the like of buttons (switches, sticks, etc.) thereof are only for illustrative purposes, and may be changed as appropriate.

Although a gyroscopic sensor (angular speed sensor) is preferably used, other motion sensors, such as an acceleration sensor, a velocity sensor, a displacement sensor, a rotation angle sensor and the like, may be used. In addition to motion sensors, a tilt sensor, an image sensor, a light sensor, a pressure sensor, a magnetic sensor, a temperature sensor and the like may be used. When any of these sensors is added, it is possible to perform an operation by utilizing an object to be detected by the sensor. When any of these sensors is used, the sensor can be added to an operation device while keeping the use of another device that is conventionally connected to the operation device.

Figure 11:
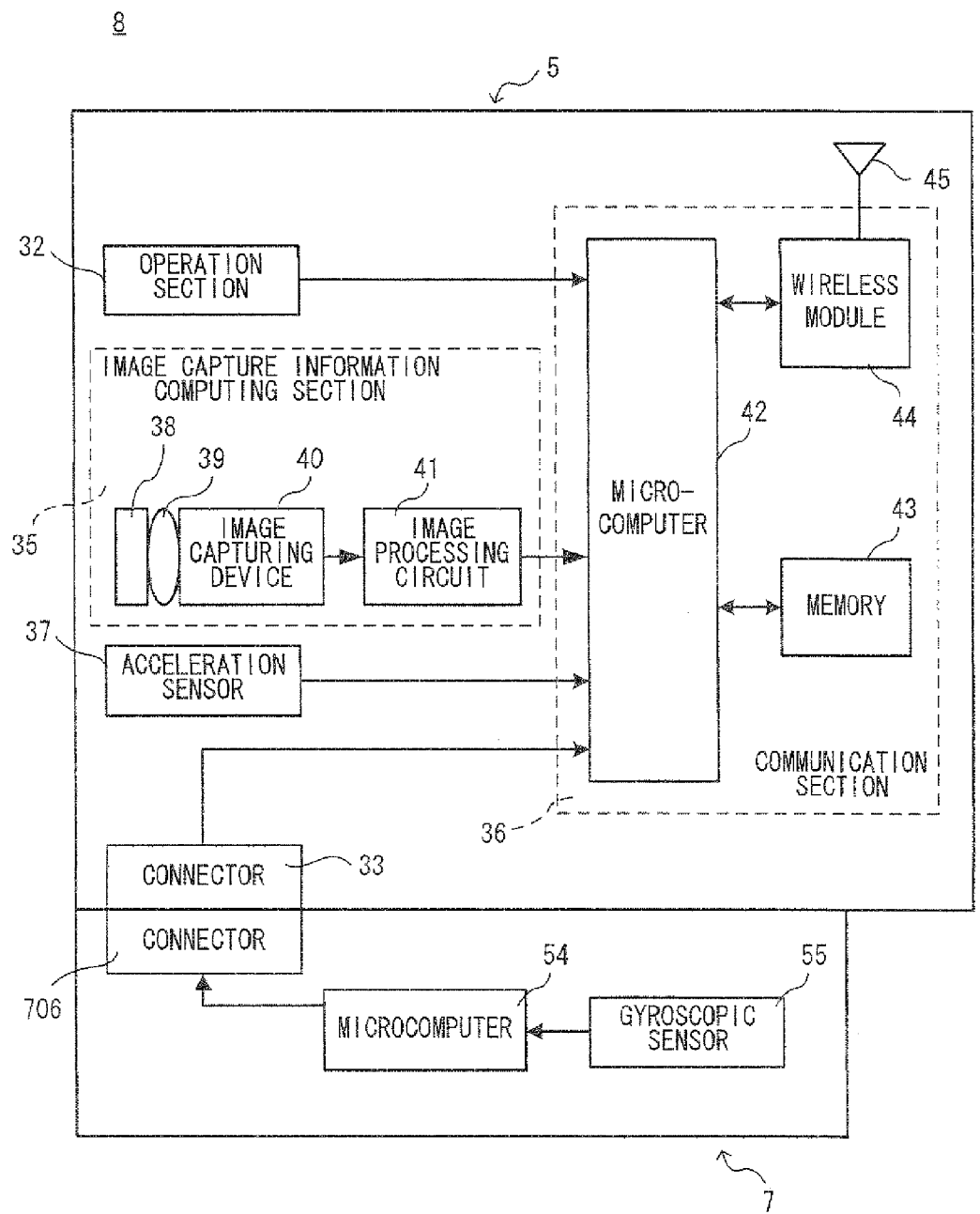
FIG. 11 is a block diagram showing a functional configuration of the input device 8.

FIG. 11 is a block diagram showing a configuration of the input device 8 (the controller 5 and the gyroscopic sensor unit 7). The controller 5 comprises an operation section 32 (the operation buttons 32a to 32i), the connector 33, the image capture information computing section 35, a communications section 36, and the acceleration sensor 37. The controller 5 transmits data indicating an operation which has been performed with respect to itself, as operation data, to the game apparatus 3.

The operation section 32 includes the operation buttons 32a to 32i, and outputs operation button data indicating an input state of each of the operation buttons 32a to 32i (whether or not each of the operation buttons 32a to 32i has been pressed down) to the microcomputer 42 of the communications section 36.

The image capture information computing section 35 is a system for analyzing image data captured by an image capturing means to determine a region having a high luminance in the image data, thereby detecting a center-of-gravity position, a size or the like of the region. The image capture information computing section 35 has, for example, a maximum sampling cycle of about 200 frames/sec, and therefore, can track and analyze a relatively high-speed motion of the controller 5.

The image capture information computing section 35 includes the infrared filter 38, the lens 39, the image capturing device 40, and the image processing circuit 41. The infrared filter 38 passes only infrared light entering from the front of the controller 5. The lens 39 collects infrared light passing through the infrared filter 38 and causes the light to enter the image capturing device 40. The image capturing device 40 may be, for example, a solid-state image capturing device, such as a CMOS sensor or a CCD sensor, receives infrared light collected by the lens 39, and outputs an image signal. Here, the markers 6R and 6L of the marker unit 6 provided in the vicinity of the display screen of the television 2 are each made of an infrared LED that outputs infrared light toward the front of the television 2. Therefore, by providing the infrared filter 38, the image capturing device 40 captures only infrared light passing through the infrared filter 38 to generate image data. Thereby, images of the markers 6R and 6L can be more correctly captured. Hereinafter, the image captured by the image capturing device 40 is referred to as a captured image. The image data generated by the image capturing device 40 is processed by the image processing circuit 41. The image processing circuit 41 calculates a position of a target object (the markers 6R and 6L) in the captured image. The image processing circuit 41 outputs coordinates indicating the calculated position to the microcomputer 42 of the communications section 36. The coordinate data is transmitted as operation data by the microcomputer 42 to the game apparatus 3. Hereinafter, the coordinates are referred to as "marker coordinates". The marker coordinates vary, depending on a direction (tilt angle) or a position of the controller 5 itself. Therefore, the game apparatus 3 can use the marker coordinates to calculate the direction or position of the controller 5.

In another embodiment, the controller 5 may not include the image processing circuit 41. A captured image itself may be transmitted from the controller 5 to the game apparatus 3. In this case, the game apparatus 3 may have a circuit or a program that has a function similar to that of the image processing circuit 41, and may calculate the marker coordinates.

The acceleration sensor 37 detects an acceleration (including a gravitational acceleration) of the controller 5, i.e., detects a force (including gravity) applied to the controller 5. Of accelerations applied to a detection portion of the acceleration sensor 37, the acceleration sensor 37 detects a value of an acceleration (linear acceleration) in a linear direction along a sensing-axis direction. For example, in the case of a multi-axis acceleration sensor having two or more axes, an acceleration component along each axis is detected as an acceleration applied to the detection portion of the acceleration sensor. For example, a three- or two-axis acceleration sensor may be available from Analog Devices, Inc. or STMicroelectronics N.V. Although the acceleration sensor 37 is here assumed to be of a capacitance type, other types of acceleration sensors may be used.

In this embodiment, the acceleration sensor 37 detects a linear acceleration along each of three axes extending in a vertical direction (y-axis direction in FIG. 3), a lateral direction (x-axis direction in FIG. 3), and a front-rear direction (z-axis direction in FIG. 3), where the controller 5 is used as a reference. Since the acceleration sensor 37 detects an acceleration with respect to a linear direction along each axis, an output of the acceleration sensor 37 indicates a value of a linear acceleration along each axis. In other words, the detected acceleration is represented as a three-dimensional vector (ax, ay, az) in an xyz coordinate system (controller coordinate system) provided where the input device 8 (the controller) is a reference. Hereinafter, a vector having, as components thereof, acceleration values with respect to the three axes which are detected by the acceleration sensor 37 is referred to as an acceleration vector.

Data (acceleration data) indicating an acceleration detected by the acceleration sensor 37 is output to the communications section 36. In this embodiment, the acceleration sensor 37 is used to output data for determining the tilt angle of the controller 5.

It would be easily understood by those skilled in the art from the description of the present specification that additional information about the controller 5 can be estimated or calculated (determined) by a computer, such as a processor (e.g., the CPU 10) of the game apparatus 3, a processor (e.g., the microcomputer 42) of the controller 5, or the like, performing a process based on an acceleration signal output from the acceleration sensor 37. For example, the computer may execute a process, assuming that the controller 5 including the acceleration sensor 37 is in the static state (i.e., the acceleration sensor 37 detects only the acceleration of gravity). In this case, when the controller 5 is actually in the static state, it can be determined whether or not or how much the attitude of the controller 5 is tilted with respect of the direction of gravity based on the detected acceleration. Specifically, with reference to a state in which the detection axis of the acceleration sensor 37 is directed vertically downward, it can be determined whether or not 1 G (acceleration of gravity) is applied to the controller 5. Also, based on the magnitude of the acceleration, it can be determined how much the controller 5 is tilted. If the acceleration sensor 37 is of the multi-axis type, it can be determined in more detail how much the controller 5 is tilted with respect to the direction of gravity, by processing an acceleration signal for each axis. In this case, the processor may calculate a tilt angle of the controller 5 based on an output of the acceleration sensor 37, or may calculate a tilt direction of the controller 5 without calculating the tilt angle. Thus, the tilt angle or attitude of the controller 5 can be determined using a combination of the acceleration sensor 37 and the processor.

On the other hand, when the controller 5 is assumed to be in a dynamic state (a state in which the controller 5 is being operated), the acceleration sensor 37 detects an acceleration corresponding to a motion of the controller 5 in addition to the acceleration of gravity. Therefore, a direction of the motion of the controller 5 can be determined by removing the acceleration-of-gravity component from the detected acceleration by a predetermined process. Even when the controller 5 is assumed to be in the dynamic state, the tilt of the controller 5 with respect to the direction of gravity can be determined by removing an acceleration component corresponding to a motion of the acceleration sensor 37 from the detected acceleration by a predetermined process. In other examples, the acceleration sensor 37 may comprise a built-in processing apparatus or another type of dedicated apparatus for performing a predetermined process with respect to an acceleration signal detected by a built-in acceleration detecting means before outputting the acceleration signal to the microcomputer 42. The built-in or dedicated processing apparatus, when used to, for example, detect a static acceleration (e.g., the acceleration of gravity) of the acceleration sensor 37, may convert the acceleration signal into a tilt angle (alternatively, another preferable parameter).

The communication section 36 includes the microcomputer 42, a memory 43, the radio module 44, and the antenna 45. The microcomputer 42 controls the radio module 44 which wirelessly transmits data obtained by the microcomputer 42 to the game apparatus 3 while using the memory 43 as a memory area during a process. The microcomputer 42 is also connected to the connector 33. Data transmitted from the gyroscopic sensor unit 7 is input via the connector 33 to the microcomputer 42.

The gyroscopic sensor unit 7 includes the connector 706, a microcomputer 54, and the gyroscopic sensor 55. As described above, the gyroscopic sensor unit 7 detects angular speeds about the three axes (the x-, y- and z-axes in this embodiment), and transmits data indicating the detected angular speeds (angular speed data) to the controller 5.

The data indicating the angular speeds detected by the gyroscopic sensor 55 is output to the microcomputer 54. Therefore, the microcomputer 54 receives the data indicating the angular speeds about the x-, y- and z-axes. The microcomputer 54 transmits the data indicating the angular speeds about the three axes as angular speed data via a plug 53 to the controller 5. Note that the transmission from the microcomputer 54 to the controller 5 is sequentially performed in predetermined cycles. Since a game process is typically performed in units of 1/60 sec (one frame time), transmission is preferably performed in cycles which are shorter than 1/60 sec.

Also, in this embodiment, for the purpose of easy calculation in an attitude calculating process described below, the three axes about which the gyroscopic sensor 55 detects angular speeds are set to coincide with the three axes (the x-, y- and z-axes) along which the acceleration sensor 37 detects accelerations. Note that, in other embodiments, the three axes about which the gyroscopic sensor 55 detects angular speeds may not coincide with the three axes along which the acceleration sensor 37 detects accelerations.

Back to the description of the controller 5, data output from the operation section 32, the image capture information computing section 35, and the acceleration sensor 37 to the microcomputer 42, and data transmitted from the gyroscopic sensor unit 7 to the microcomputer 42, are temporarily stored in the memory 43. These pieces of data are transmitted as the operation data to the game apparatus 3. Specifically, when the timing of transmission to the wireless controller module 19 of the game apparatus 3 arrives, the microcomputer 42 outputs the operation data stored in the memory 43 to the radio module 44. The radio module 44 uses, for example, the Bluetooth® technique to modulate carrier waves having a predetermined frequency with the operation data, and emits a resultant weak radio wave signal from the antenna 45. In other words, the operation data is modulated by the radio module 44 into the weak radio wave signal, which is in turn transmitted from the controller 5. The weak radio wave signal is received by the wireless controller module 19 of the game apparatus 3. By demodulation or decoding of the received weak radio wave signal, the game apparatus 3 can obtain the operation data. The CPU 10 of the game apparatus 3 performs a game process based on the obtained operation data and a game program. Note that wireless transmission from the communication section 36 to the wireless controller module 19 is sequentially executed in predetermined cycles. A game process in this embodiment is assumed to be executed in units of 1/30 sec or 1/60 sec (one frame time). Therefore, the wireless transmission is preferably performed in cycles which are shorter than 1/30 sec or 1/60 sec. In this embodiment, for example, it is assumed that the communication section 36 of the controller 5 outputs each piece of operation data to the wireless controller module 19 of the game apparatus 3 at a rate of one per 1/200 sec.

The player can perform an operation of tilting the input device 8 at any tilt angle in addition to a conventional general game operation of pressing down each operation button. In addition, the player can perform an operation of pointing any position on a screen using the input device 8 and an operation of moving the input device 8 itself.

Figure 12:
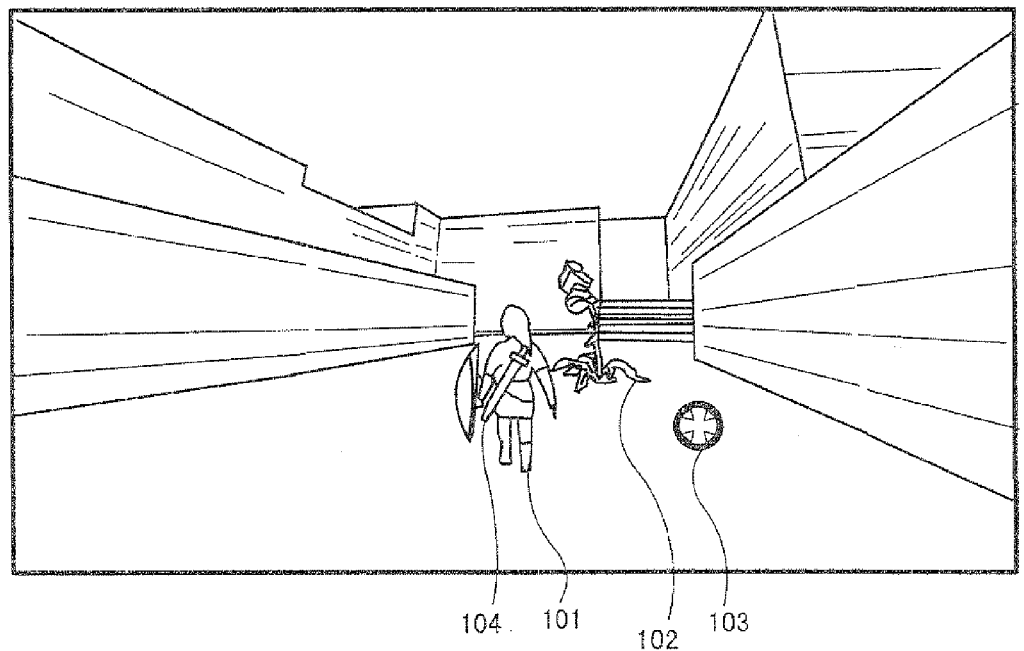
FIG. 12 is a diagram showing an exemplary game screen assumed in this embodiment.

Next, outlines of a game assumed in this embodiment and a process according to this embodiment will be described with reference to FIGS. 12 to 22. The game is an action-adventure game in which a player object is operated in a virtual three-dimensional space. FIG. 12 shows an exemplary screen of the game assumed in this embodiment. In FIG. 12, an appearance of the three-dimensional virtual game space is displayed on the game screen. In the three-dimensional virtual game space, a player object 101 exists, and its whole body is displayed. The game screen also displays an enemy object 102 and a cursor 103. In this state, the player object 101 can be moved. Also, on the screen of FIG. 12, the player object 101 shoulders a sword object 104, which is in the scabbard. The state of the player object 101 in this case is referred to as a "non-combat state".

Figure 13:
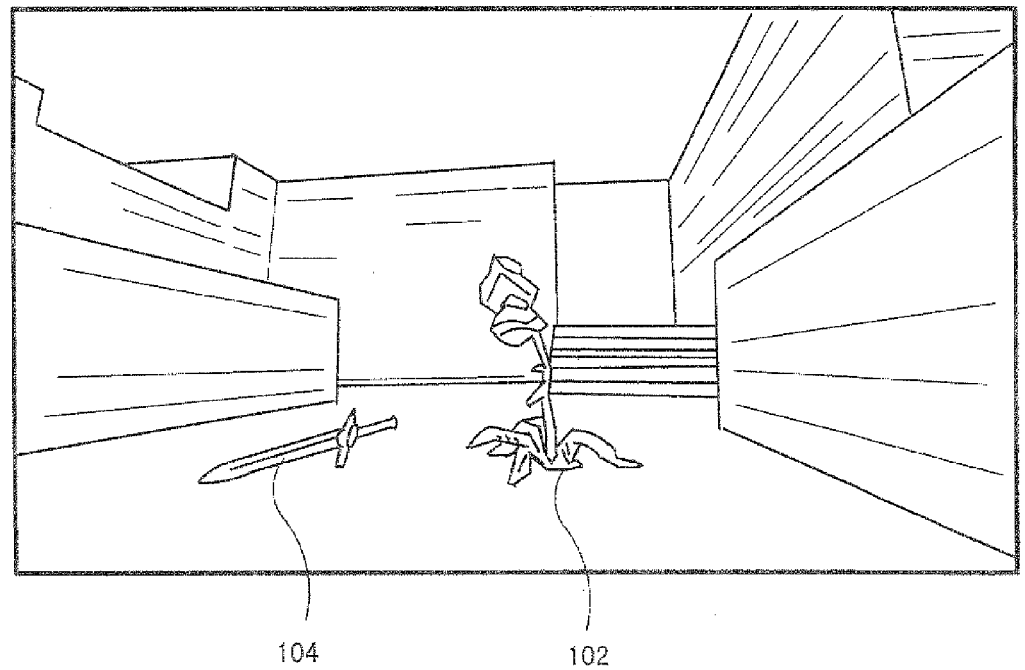
FIG. 13 is a diagram showing an exemplary game screen assumed in this embodiment.

In this game, when attacking the enemy object 102, the screen can be switched to an image that is viewed from the player object 101 (the first-person viewpoint). The screen switching operation can be achieved by performing an operation called "pointer lock". Specifically, in a state as shown in FIG. 12, the player puts the cursor 103 on the enemy object 102. Specifically, for example, the cursor 103 can be moved in accordance with a movement of the input device 8 based on the marker coordinates obtained from the image capture information computing section 35. An operation to press a predetermined button (e.g., the operation button 32d) performed by the player in this case is referred to as a "pointer lock" operation. Such an operation triggers execution of a process of locking onto the enemy object 102 on which the cursor 103 is put. In this case, a virtual camera is shifted to a position of an eye of the player object 101, so that a game screen as viewed from the first-person viewpoint (hereinafter referred to as a "subjective screen") is displayed as shown in FIG. 13. Also in this case, the player object 101 draws the sword object 104 from the scabbard (not shown on the screen).

Next, a control relating to the subjective screen will be described. On the subjective screen, the focal point of the virtual camera is set on the enemy object 102 on which the cursor 103 is put. In other words, a virtual camera control is performed so that the player object 101 pays attention to the enemy object 102. Also, as shown in FIG. 13, a game screen as viewed from the first person (i.e., the player object 101) is displayed, so that the sword object 104 is displayed (since it has been drawn from the scabbard), though the player object 101 itself is not displayed. The player can operate the sword object 104 by moving or swinging the input device 8 as if the input device 8 were a sword. For example, in a state as shown in FIG. 13 (in this case, the attitude of the input device 8 is assumed to be substantially the same as the attitude of the sword object 104). When the player moves the input device 8 obliquely upward from left to right at a predetermined speed or more (i.e., the player performs a motion as if the player cut or slashed obliquely rightward and upward), the sword object 104 can be used to attack and cut or slash the enemy object 102 as shown in FIG. 14. In FIG. 14, the sword object 104 hits the enemy object 102. A motion blur effect 105 that indicates a trajectory of the sword object 104 is displayed, providing a dramatic impression.

Note that when the subjective screen is displayed, then if the player kills the enemy object 102 or performs a predetermined operation to cancel the subjective screen, the subject screen can be switched to a screen as shown in FIG. 12. In other words, a virtual camera control can be switched from the first-person viewpoint control to a camera control that allows the virtual camera to capture an image of the whole body of the player object 101 as shown in FIG. 12.

Next, an attack operation on the subjective screen will be described. The sword object 104 can be operated by moving the input device 8 as if it were a sword on the subjective screen as described above. In this game, two states, i.e., a "ready state" and an "attacking state", are defined as states of the player object 101 on the subjective screen.

The "ready state" indicates that the player object 101 is ready to attack using the sword object 104, which has been drawn from the scabbard. In this state, a position or an attitude of the sword object 104 is updated based an angular speed output from the input device 8. Also, in the "ready state", it is not determined whether or not the sword object 104 collides with another object (typically, the enemy object 102).

On the other hand, the "attacking state" indicates that the player object 101 is attacking, moving the sword object 104. In this game, when the player moves the input device 8 at a predetermined speed or more in the "ready state", the "ready state" can be switched to the "attacking state". When the speed at which the input device 8 is moved becomes less than a predetermined speed in the "attacking state", the "attacking state" is ended and switched back to the "ready state". In other words, the "attacking state" is a state in which the sword object 104 is moving at a speed that is higher than or equal to a predetermined speed.

Also, in the "attacking state", it is determined whether or not the sword object 104 collides with another object. Therefore, in the "ready state", for example, when the input device 8 is moved from left to right at a speed less than the predetermined speed (i.e., moved slowly), then even if the sword object 104 overlaps the enemy object 102, the collision determination is not performed, and the sword object 104 passes over the enemy object 102. In other words, the sword object 104 does not hit the enemy object 102. On the other hand, if the player moves the input device 8 at a speed higher than or equal to the predetermined speed (i.e., the sword object 104 is moved toward the enemy object 102 at a speed higher than or equal to a predetermined speed), the sword object 104 collides with the enemy object 102 (i.e., the enemy object 102 can be hit by an attack).

Thus, the collision determination is not performed when the moving speed of the input device 8 (the sword object 104) is less than the predetermined speed. This is because when the player moves the input device 8 slowly, then if the collision determination is performed, the flexibility of the ready state (movement) of the sword object 104 decreases. For example, when the sword object 104 is moved at a narrow place surrounded by obstacles in the game space, then if the collision determination is performed every time the sword object 104 collides with a wall, an obstacle or the like, a starting position of cutting or slashing cannot be set, so that it is difficult to cut or slash a target, resulting in a reduction in operability. Therefore, when the input device 8 is slowly moved, the collision determination for the sword object 104 is not performed, thereby increasing the operability.

Note that, in this game, a range within which the sword object 104 can be moved is limited. Specifically, in order to prevent the sword object 104 from being moved to an unnatural position with respect to a range within which a human arm can be moved, a range within which a sword can be moved is previously determined as a "sword movable range" based on the arm movable range. FIG. 15 is a schematic diagram showing an example of the sword movable range. FIG. 15 shows a virtual game space as viewed from the top, in which a range in the shape of substantially a sector extending forward around the player object 101 as a center thereof is defined as a "sword movable range".

Next, a control of the sword object 104 in the "attacking state" will be described. As described above, when the player moves the input device 8 at a speed higher than or equal to the predetermined speed in the "ready state", the "ready state" is switched to the "attacking state". In this embodiment, it is determined whether or not the input device 8 is moved at the predetermined speed or more, based on acceleration data output from the acceleration sensor 37. Specifically, when an acceleration higher than or equal to a predetermined value is detected, the "ready state" is switched to the "attacking state". A moving direction and a moving speed of the sword object 104 are set based on the acceleration. In this embodiment, the moving direction and speed of the sword object 104 are determined using only accelerations along the x- and y-axes. In other words, only "cutting or slashing" motions using the sword object 104 are taken into consideration, but not "thrusting" motions (accelerations occurring in the z-axis). Note that a process may be performed, taking into consideration an acceleration in the z-axis (such a process will be described below).

Also, in order to allow the collision determination for the sword object 104, sphere objects having a predetermined size are set as "strike determination spheres" for the sword object 104. Note that the strike determination sphere is set not to be seen from the player (it is not shown on the game screen). FIGS. 16A to 16C show exemplary settings of strike determination spheres. In FIG. 16A, three strike determination spheres 107a, 107b and 107c (hereinafter also collectively referred to as "strike determination spheres 107") are set on the blade of the sword object 104. The collision determination is performed based on whether or not the strike determination spheres 107 collide with another object.

Note that the size and number of strike determination spheres 107 are set, depending on the magnitude of the acceleration. For example, when the acceleration is large, force applied to the sword is considered to be large. In this case, as shown FIG. 16B, larger strike determination spheres 107a to 107c may be set so that a larger area can be cut or slashed. Also, when the magnitude of the acceleration is small, force applied to the sword is considered to be small. In this case, as shown in FIG. 16C, smaller strike determination spheres 107 may be set. Thus, by setting the size and number of strike determination spheres 107, depending on the acceleration, the degree of a cut or slash that would be made by the sword can be changed, thereby causing the game to be more enjoyable. Also, an effect or damage by cutting or slashing with the sword may be set, depending on the magnitude of the acceleration.

If the moving direction, the moving speed and the strike determination spheres 107 of the sword object 104 are set based on the acceleration as described above, then when the player object 101 is in the "attacking state", a process of moving the sword object 104 in the moving direction is performed. It is here assumed in this embodiment that a game image is drawn at intervals of 1/30 sec or 1/60 sec, and operation data is transmitted from the input device 8 at intervals of 1/200 sec. Also, in this embodiment, a process of reflecting the attitude of the input device 8 on the attitude of the sword object 104 is performed based on angular speed data transmitted the input device 8, in each interval.

Figure 17:
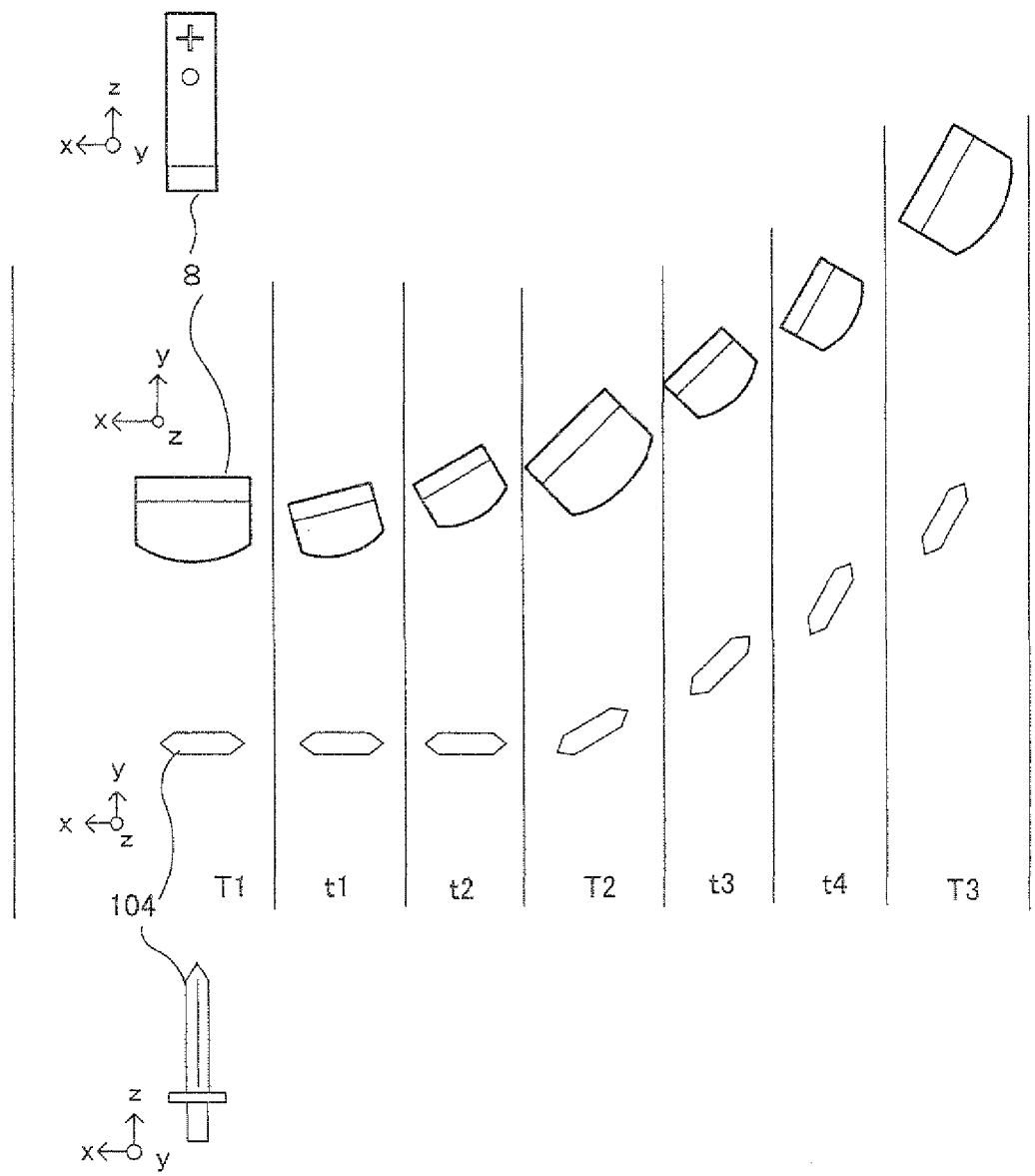
FIG. 17 is a diagram for describing the concept of a control in an attacking process.

FIG. 17 is a schematic diagram showing the concept of the process. FIG. 17 shows a state of the input device 8 horizontally held, as viewed from the rear (a side where the connector 33 is provided (see FIG. 3)). Also, a series of motions of the input device 8 when it is swung upward and rightward is shown. The sword object 104 horizontally held, as viewed from the rear, is also shown. Drawing timings T1 to T3 show timings at which a drawing process is executed. Update timings t1 to t4 show timings at which operation data are transmitted from the input device 8.

In this process, at the drawing timing T1, the moving direction and the moving speed of the sword object 104 are determined based on an acceleration detected at the time. Thereafter, until the next drawing timing T2, the sword object 104 is moved in accordance with the moving direction and the moving speed. In this case, the attitude of the sword object 104 is updated based on angular speed data. Specifically, at each of the update timings t1 and t2, the attitude of the sword object 104 is changed based on angular speed data detected at the time. Thereafter, at the next drawing timing T2, the moving direction and the moving speed of the sword object 104 are calculated again based on an acceleration detected at the time. Thereafter, until the next drawing timing T3, the sword object 104 is moved in accordance with the recalculated moving direction, while the attitude of the sword object 104 is updated based on angular speed data at the update timings t3 and t4.

Figure 18A:
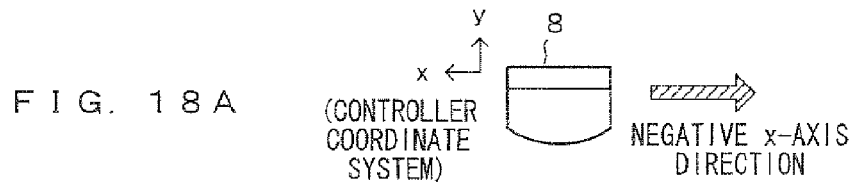
FIGS. 18A and 18B are diagrams for describing a control in the attacking process.
Figure 18B:
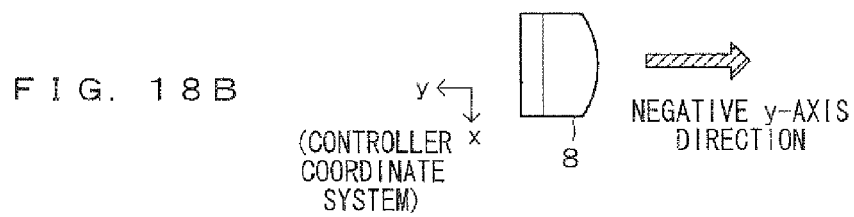
Figure 19:
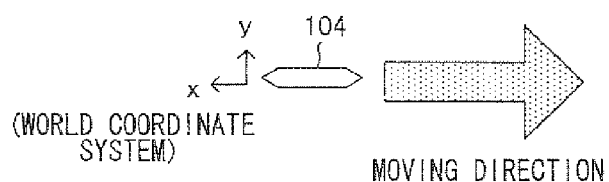
FIG. 19 is a diagram for describing a control in the attacking process.

The process shown in FIG. 17 will be described in more detail. Firstly, at the drawing timing T1, the direction of the acceleration is determined in the controller coordinate system (the xyz coordinate system with reference to the input device 8). For example, as shown in FIG. 18A, when the input device 8 is moved rightward while being horizontally held, an acceleration in the negative direction of the x-axis is detected. Also, when the input device 8 is moved rightward while is tilted by 90 degrees as shown in FIG. 18B, an acceleration in the negative direction of the y-axis is detected. Thereafter, the acceleration is applied to the attitude of the sword object 104 (the same as the attitude of the input device 8 in FIG. 17) at the drawing timing T1 of FIG. 17 to determine the moving direction and the moving speed of the sword object 104 in the virtual game space. In other words, a movement of the sword object 104 is determined and started in the direction of the detected acceleration in a local coordinate system of the sword object 104 (an xyz coordinate system where the sword object 104 is a reference as in the controller coordinate system). In the example of FIG. 17, a rightward movement is started (see FIG. 19).

Figure 20:
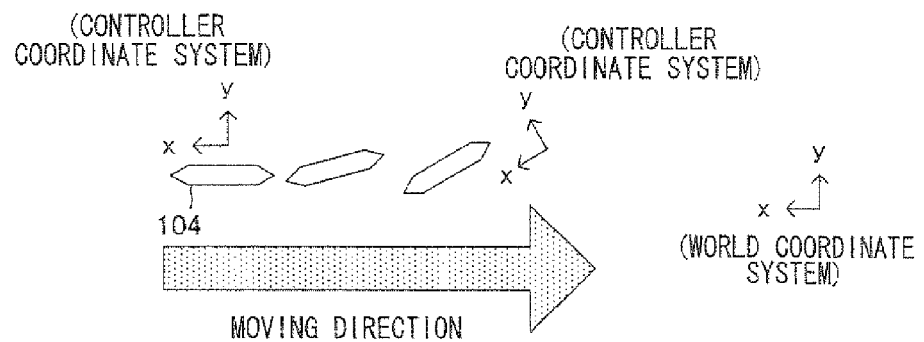
FIG. 20 is a diagram for describing a control in the attacking process.
Figure 21:
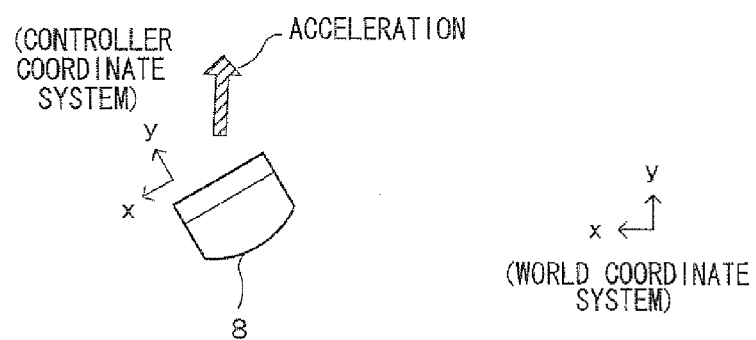
FIG. 21 is a diagram for describing a control in the attacking process.
Figure 22:
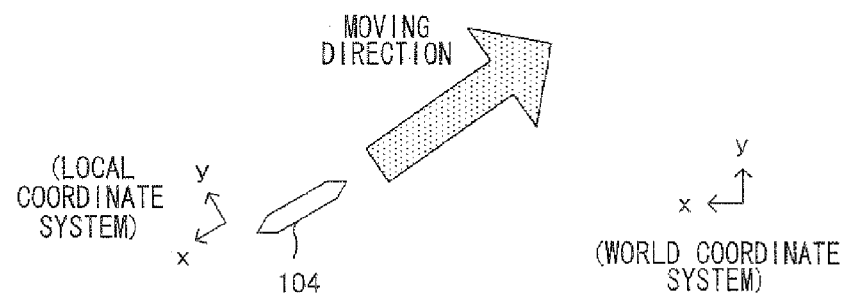
FIG. 22 is a diagram for describing a control in the attacking process.

Thereafter, until the next drawing timing T2, angular speeds are obtained at the update timings t2 and t3, and are applied to the attitude of the sword object 104 at the times to update the attitude of the sword object 104. For example, in the example of FIG. 17, an angular speed in a roll angle direction is detected, and a process of changing the attitude of the sword object 104 in the roll angle direction is executed (note that, also in this case, the controller coordinate system, and the local coordinate system of the sword object 104 are references). On the other hand, until the next drawing timing T2, the movement of the sword object 104 is continued. In this case, the moving direction is one that has been determined since the drawing timing T1. In other words, as shown in FIG. 20, the sword object 104 is moved rightward while the attitude (tilt) is gradually changed.

Thereafter, at the next drawing timing T2, an acceleration is obtained. Based on the acceleration and an attitude (updated based on the angular speed) at the time of the sword object 104, a new moving direction and moving speed of the sword object 104 are determined again. Specifically, at the drawing timing T2, the input device 8 is tilted where the right side is slightly higher than the left side. In this state, when the input device 8 is moved obliquely upward and rightward, the input device 8 moving rightward is further moved upward, i.e., an upward acceleration is applied. In this case, in the controller coordinate system, an oblique acceleration somewhere between the positive y-axis direction and the negative x-axis direction is detected (see FIG. 21). The acceleration direction in the local coordinate system of the input device 8 is converted into a direction in the world coordinate system based on an attitude (also tilted where the right side is higher than the left side) of the sword object 104 updated based on the angular speed. The resultant acceleration is applied the moving sword object 104, so that the moving direction is changed to an upward and rightward direction. When the movement is ended, an acceleration is applied in a direction opposite to the moving direction, so that the sword object 104 is stopped.

Thus, by updating the attitude based on the angular speed, a slight change in the attitude of the input device 8 that otherwise could not be calculated using only the acceleration can be reflected on the attitude of the sword object 104, so that the motion of the sword object 104 can be caused to more correctly correspond to the player's motion. Note that, in this example, the update period of the moving direction based on the acceleration is the same as the update period of screen display, which is longer than the update period of the attitude based on the angular speed. In an alternative example, the updating of the moving direction based on the acceleration may be performed at the same timing of the updating of the attitude.

Figure 23:
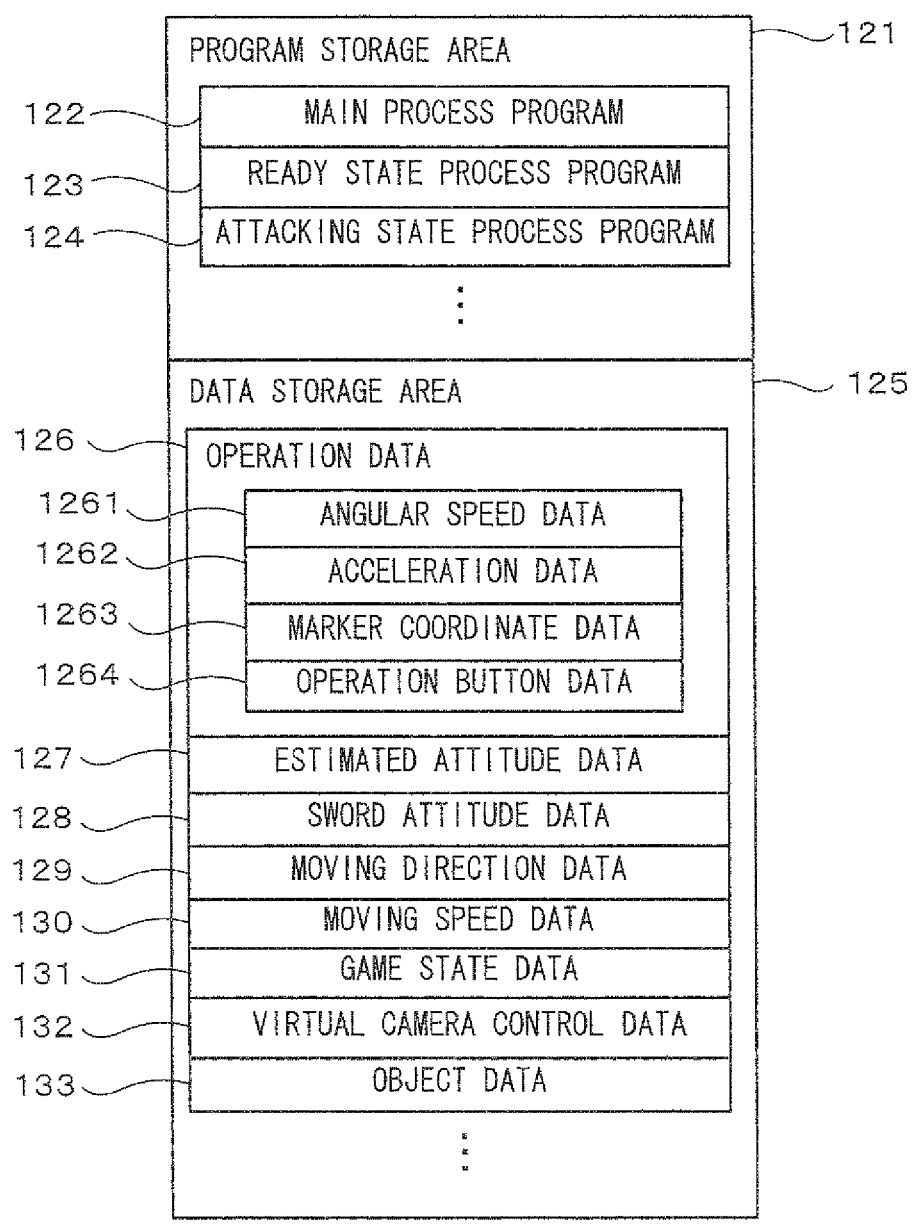
FIG. 23 is a diagram showing a memory map in an external main memory 12.

Next, the game process performed by the game apparatus 3 will be described in more detail. Firstly, data that is stored in the external main memory 12 during the game process will be described. FIG. 23 is a diagram showing a memory map of the external main memory 12 in the game apparatus 3. In FIG. 23, the external main memory 12 includes a program storing area 121 and a data storing area 125. A portion of data in the program storing area 121 and the data storing area 125 is originally stored on the optical disc 4, and is transferred and stored into the external main memory 12 during execution of a game program.

The program storing area 121 stores a game program that is to be executed by the CPU 10. The game program includes a main process program 122, a ready state process program 123, an attacking state process program 124 and the like. The main process program 122 is a program corresponding to a flowchart shown in FIG. 24 described below. The ready state process program 123 is a program for causing the CPU 10 to execute a process in the "ready state". The attacking state process program 124 is a program for causing the CPU 10 to execute a process in the "attacking state".

The data storing area 125 stores data, such as operation data 126, estimated attitude data 127, sword attitude data 128, moving direction data 129, moving speed data 130, game state data 131, virtual camera control data 132, object data 133 and the like. In addition, the data storing area 125 stores audio data or the like used in the game process.

The operation data 126 is operation data that is transmitted from the controller 5 to the game apparatus 3. As described above, operation data is transmitted from the controller 5 to the game apparatus 3 at a rate of once per $\frac{1}{200}$ sec. Therefore, the operation data 126 stored in the external main memory 12 is updated at this rate. In this embodiment, only the latest (last obtained) operation data may be stored in the external main memory 12. Note that, for example, when previous operation data is utilized to correct data, operation data obtained by performing an operation several times may be stored.

The operation data 126 stores angular speed data 1261, acceleration data 1262, marker coordinate data 1263, and operation button data 1264. The angular speed data 1261 is data indicating an angular speed detected by the gyroscopic sensor 55 of the gyroscopic sensor unit 7. Here, angular speed data 63 indicates angular speeds about the three axes (the x-, y- and z-axes) of FIG. 3. The acceleration data 1262 is data indicating an acceleration (acceleration vector) detected by the acceleration sensor 37. Here, the acceleration data 1262 indicates a three-dimensional acceleration vector including, its components, accelerations in the directions of the three axes (the x-, y- and z-axes) of FIG. 3. In this embodiment, it is assumed that an acceleration vector 1 detected by the acceleration sensor 37 when the controller 5 is at rest has a magnitude of "1". In other words, a gravitational acceleration detected by the acceleration sensor 37 has a magnitude of "1".

The marker coordinate data 1263 is coordinates calculated by the image processing circuit 41 of the image capture information computing section 35, i.e., data indicating the marker coordinates. The marker coordinates are represented in a two-dimensional coordinate system for indicating a position on a plane corresponding to a captured image. Note that when images of the two markers 6R and 6L are captured by the image capturing device 40, two marker coordinate points are calculated. On the other hand, when either of the markers 6R and 6L does not fall within a range in which an image can be captured by the image capturing device 40, the image of only one marker is captured by the image capturing device 40, so that only one marker coordinate point is calculated. When none of the markers 6R and 6L falls within the range in which an image can be captured by the image capturing device 40, no marker image is captured by the image capturing device 40, so that no marker coordinate point is calculated. Therefore, the marker coordinate data 1263 may indicate two marker coordinate points, a single marker coordinate point, or no marker coordinate point.

The operation button data 1264 is data indicating input states of the operation buttons 32*a* to 32*i*.

The estimated attitude data 127 is data for indicating the attitude of the input device 8. The sword attitude data 128 is data for indicating the attitude of the sword object 104.

The moving direction data 129 is data indicating the moving direction of the sword object 104 in the "attacking state". The moving speed data 130 is data indicating the moving speed of the sword object 104 in the "attacking state".

The game state data 131 is data for indicating in which state the player object 101 is, the "non-combat state", the "ready state" or the "attacking state".

The virtual camera control data 132 is data for controlling the virtual camera, including a position, an angle of view, a focal point and the like of the virtual camera.

The object data 133 is data of each object used in a game process, such as the player object 101, the enemy object 102 or the like.

Figure 24:
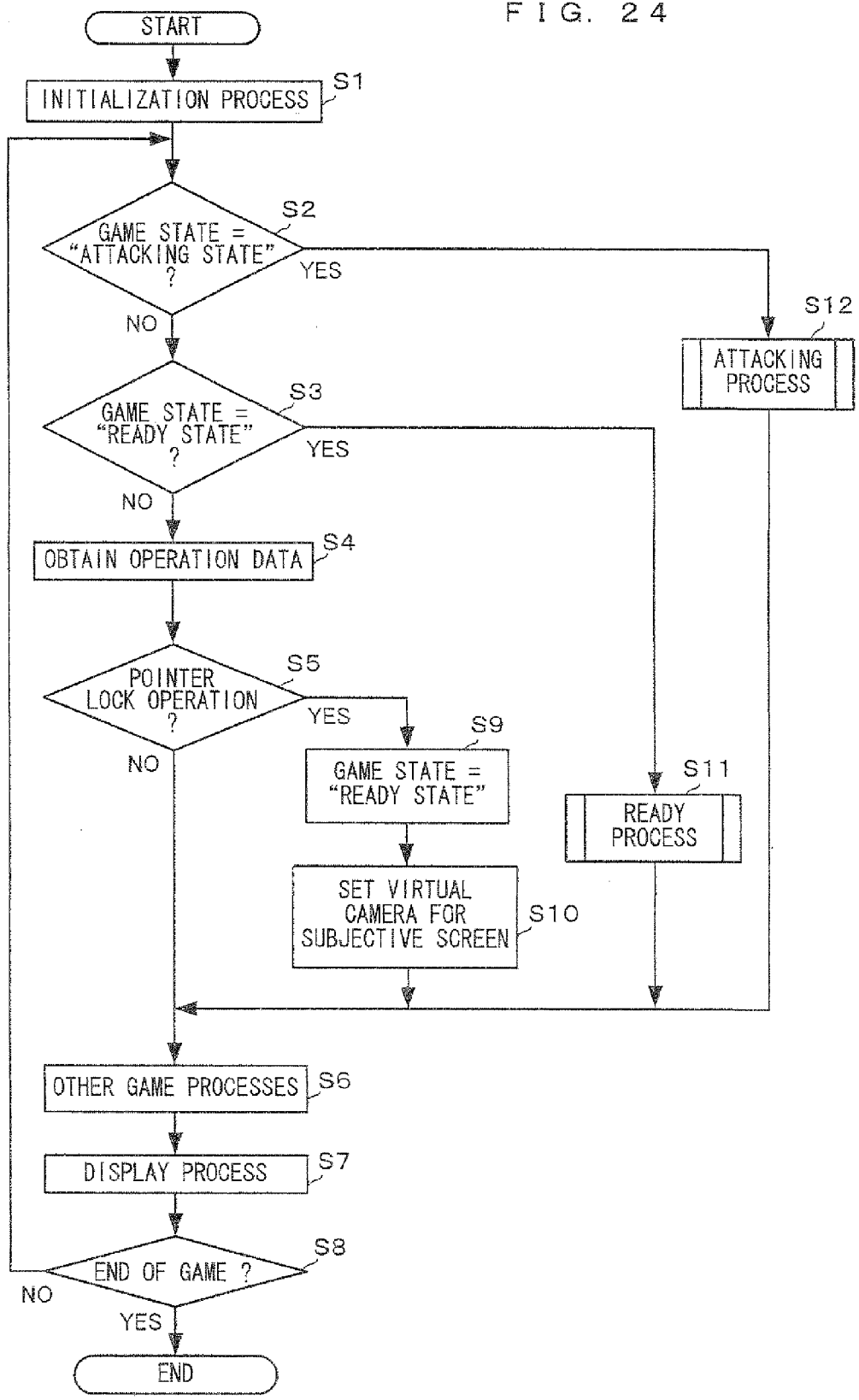
FIG. 24 is a flowchart showing a game process according to an embodiment of the present invention.

Next, a game process executed by the game apparatus 3 will be described with reference to FIGS. 24 to 28. When the game apparatus 3 is powered ON, the CPU 10 of the game apparatus 3 executes the boot program stored in the ROM/RTC 13, thereby initializing units, such as the external main memory 12 and the like. Thereafter, a game program stored on the optical disc 4 is read into the external main memory 12, and the CPU 10 starts execution of the game program. FIG. 24 is a flowchart showing a game process that is performed after completion of the aforementioned process. A process loop of steps S2 to S9 of FIG. 24 is executed for each frame (note that a process loop of steps S51 to S55 of FIG. 27 described below is excluded).

In FIG. 24, initially, the CPU 10 executes an initialization process for initializing data used in the subsequent processes (step S1). Specifically, data indicating the "non-combat state" is stored as the game state data 131 into the external main memory 12. This is because, in this embodiment, it is assumed that the player object 101 is in the non-combat state immediately after the start of a game. The CPU 10 also sets various parameters (a position, an angle of view, and a focal point) into the virtual camera control data 132 so that a game screen (hereinafter referred to as an objective screen) is displayed as shown in FIG. 12. The CPU 10 also constructs a three-dimensional game space, and places the player object 101 and the like at appropriate positions. An image of the thus-constructed game space captured by the virtual camera is generated as a game image, and the generated game image is displayed on the television 2.

Next, the CPU 10 refers to the game state data 131 to determine whether or not the player object 101 is in the "attacking state" (step S2). If the result of the determination indicates the "attacking state" (YES in step S2), a process of step S12 described below is executed. On the other hand, if the player object 101 is not in the "attacking state" (NO in step S2), the CPU 10 determines whether or not the player object 101 is in the "ready state" (step S3). If the result of the determination indicates the "ready state" (YES in step S3), the CPU 10 goes to a process of step S11 described below.

On the other hand, if the player object 101 is not in the "ready state" (NO in step S3), the player object 101 is in the "non-combat state". In this case, the CPU 10 obtains the operation data 126 from the external main memory 12 (step S4).

Next, the CPU 10 determines whether or not an operation performed by the player that is indicated by the operation data 126 is the "pointer lock" operation (step S5). In other words, it is determined whether or not an operation that causes a transition from the "non-combat state" to the "ready state" has been performed. If the result of the determination indicates that the "pointer lock" operation has been performed (YES in step S5), the CPU 10 sets data indicating the "ready state" into the game state data 131 (step S9). The CPU 10 also puts settings for the subjective screen (see FIG. 13) into the virtual camera control data 132. Specifically, the CPU 10 sets a position of the virtual camera to a position of an eye of the player object 101, a focal point thereof to the enemy object 102 locked onto by the pointer lock operation, and the like. Thereafter, the CPU 10 executes game various processes other than processes relating to the "ready state" and the "attacking state" described below (step S6). Note that, in this embodiment, the contents of the game process are not directly relevant to the present invention and will not be described in detail.

On the other hand, if the result of the determination in step S5 indicates that the pointer lock operation has not been performed (NO in step S5), the CPU 10 goes to a process of step S6 without performing processes of steps S9 and S10.

After step S6, the CPU 10 executes a display process (step S7). Specifically, an image of the virtual space captured by the virtual camera is displayed as a game image on the television 2. After step S7, the CPU 10 determines whether or not to end the game (step S8). If the result of the determination is positive, the CPU 10 ends the game process. If the result of the determination is negative, the CPU goes back to step S2, and repeats the game process of this embodiment.

Figure 25:
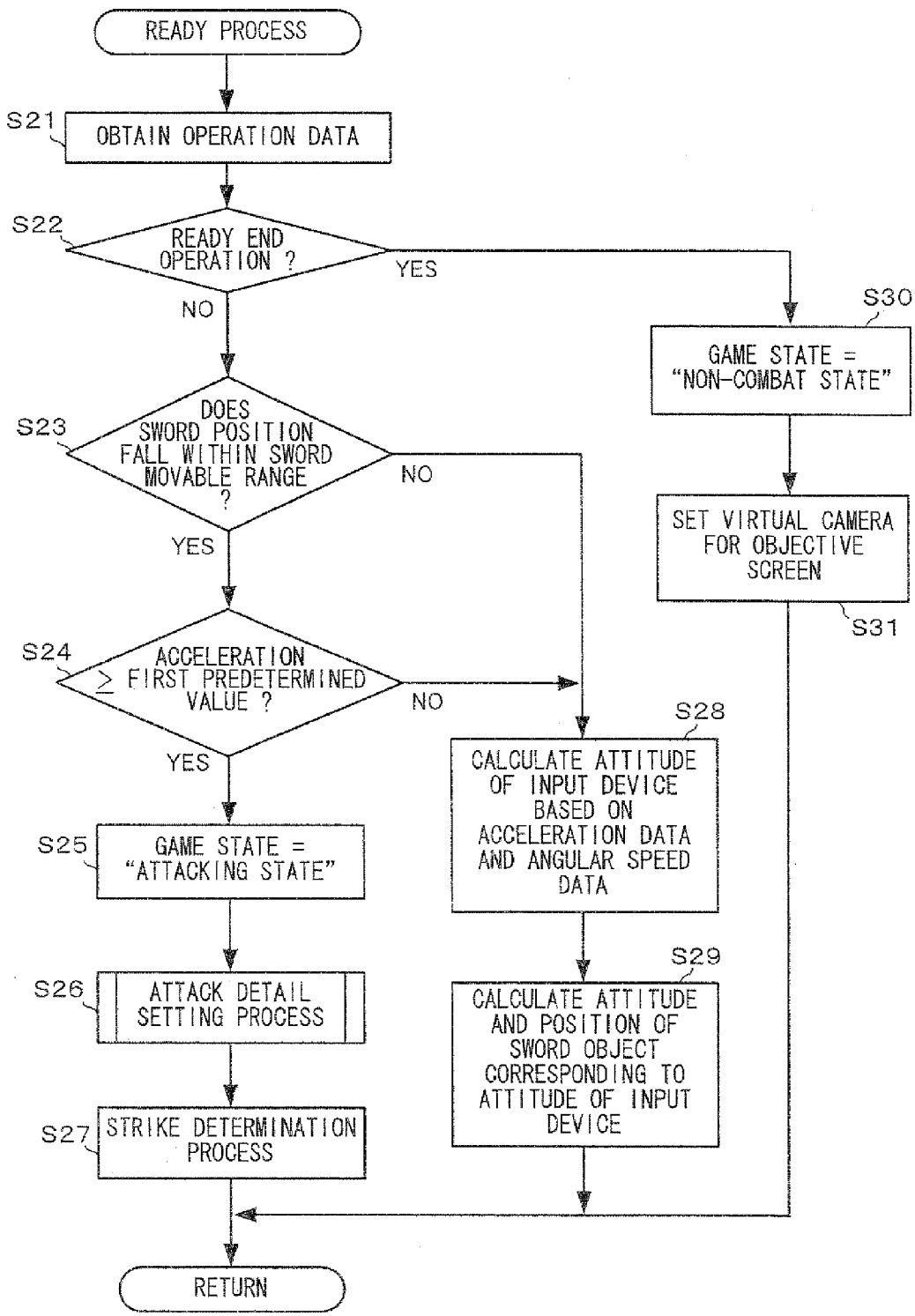
FIG. 25 is a flowchart showing a ready process of step S11 of FIG. 24 in detail.

Next, the "ready process" mentioned in step S11 above will be described. FIG. 25 is a flowchart showing the ready process of step S11 in detail. In FIG. 25, initially, the CPU 10 obtains the operation data 126 from the external main memory 12 (step S21).

Next, the CPU 10 determines whether or not the contents of the operation data 126 indicate an operation for ending the "ready state" (step S22). In other words, the CPU 10 determines whether or not an operation for changing the "ready state" back to the "non-combat state" has been performed. Specifically, for example, it is determined whether or not a predetermined button operation has been performed, or whether or not an operation has not been performed for a predetermined period of time (a predetermined time or more during which an operation is not input has elapsed). If the result of the determination indicates that an operation for ending the "ready state" has been performed (YES in step S22), the CPU 10 sets data indicating the "non-combat state" into the game state data 131 (step S30). Following this, the CPU 10 puts settings for the objective screen into the virtual camera control data 132 (step S31). Thereafter, the CPU 10 ends the ready process.

On the other hand, if the result of the determination in step S22 indicates that the operation contents of the operation data 126 does not indicate an operation for ending the "ready state" (NO in step S22), then the CPU 10 determines whether or not a position of the sword object 104 falls within the sword movable range (see FIG. 15) (step S23). As a result, if the position of the sword object 104 does not fall within the sword movable range (NO in step S23), then the CPU 10 executes a process of estimating an attitude of the input device 8 based on the acceleration data 1262 and the angular speed data 1261 (step S28). This process may be carried out in any manner. In this embodiment, as described above, initially, the attitude of the input device 8 is calculated based on an angular speed detected by the gyroscopic sensor unit 7. For example, the attitude is calculated by successively adding angular speeds (per unit time) to an initial attitude. Specifically, a current attitude can be calculated by updating the previously calculated attitude, i.e., successively adding a change to the previously calculated attitude based on an angular speed successively output from the gyroscopic sensor unit 7, starting from the initial state. Next, the attitude calculated from the angular speed is corrected based on acceleration data detected by the acceleration sensor 37. In this embodiment, the attitude calculated from the angular speed is corrected to be closer to the attitude determined based on the acceleration data. Next, when the attitude is updated based on the angular speed, the angular speed is added to the corrected attitude. Specifically, the attitude determined based on the acceleration data refers to an attitude of the input device 8 when it is assumed that the acceleration indicated by the acceleration data has a vertical downward direction. In other words, the attitude is calculated, assuming that the acceleration indicated by the acceleration data is a gravitational acceleration. The attitude determined based on the acceleration is correct when the sensor is at rest, but includes an error when the sensor is moving. On the other hand, when an error is included in an output of the gyroscopic sensor, errors are accumulated in the calculated attitude over time. Therefore, an attitude having a small error is calculated by always correcting and updating the attitude. The thus-corrected attitude is stored as the estimated attitude data 127 into the external main memory 12. Note that when the acceleration data is not used, an attitude may be provided by applying the result of integration of angular speeds to an initial attitude.

Next, the CPU 10 calculates the attitude and the position of the sword object 104 based on the attitude of the input device 8 indicated by the estimated attitude data 127 (step S29). In other words, a process of reflecting the attitude of the input device 8 on the attitude and the position of the sword object 104 is executed. Specifically, the orientation of the sword object 104 in the screen is caused to correspond to the orientation of the input device 8 held by the player facing the screen, and the sword object 104 is placed at a position, taking into consideration the length of an arm of the player character holding the sword object 104 or the like. Specifically, the orientation of the input device 8 is calculated from its attitude, and the sword object 104 is placed at a position that is located at a predetermined distance from a predetermined center position of the game space, with the attitude of the sword object 104 having an orientation corresponding to the orientation of the input device 8. Thereby, in the "ready state", the attitude of the input device 8 moved by the player is reflected on the sword object 104.

On the other hand, if the result of the determination in step S23 indicates that the position of the sword object 104 falls within the sword movable range (YES in step S23), then the CPU 10 refers to the acceleration data 1262 included in the operation data 126 to determine whether or not an acceleration having a magnitude larger than or equal to a first predetermined value has been generated (step S24). If the result of the determination indicates that an acceleration having a magnitude larger than or equal to the first predetermined value has not been generated (NO in step S24), the CPU 10 goes to the process of step S28. On the other hand, if an acceleration having a magnitude larger than or equal to the first predetermined value has been generated (YES in step S24), then the CPU 10 sets data indicating the "attacking state" into the game state data 131 (step S25).

Figure 26:
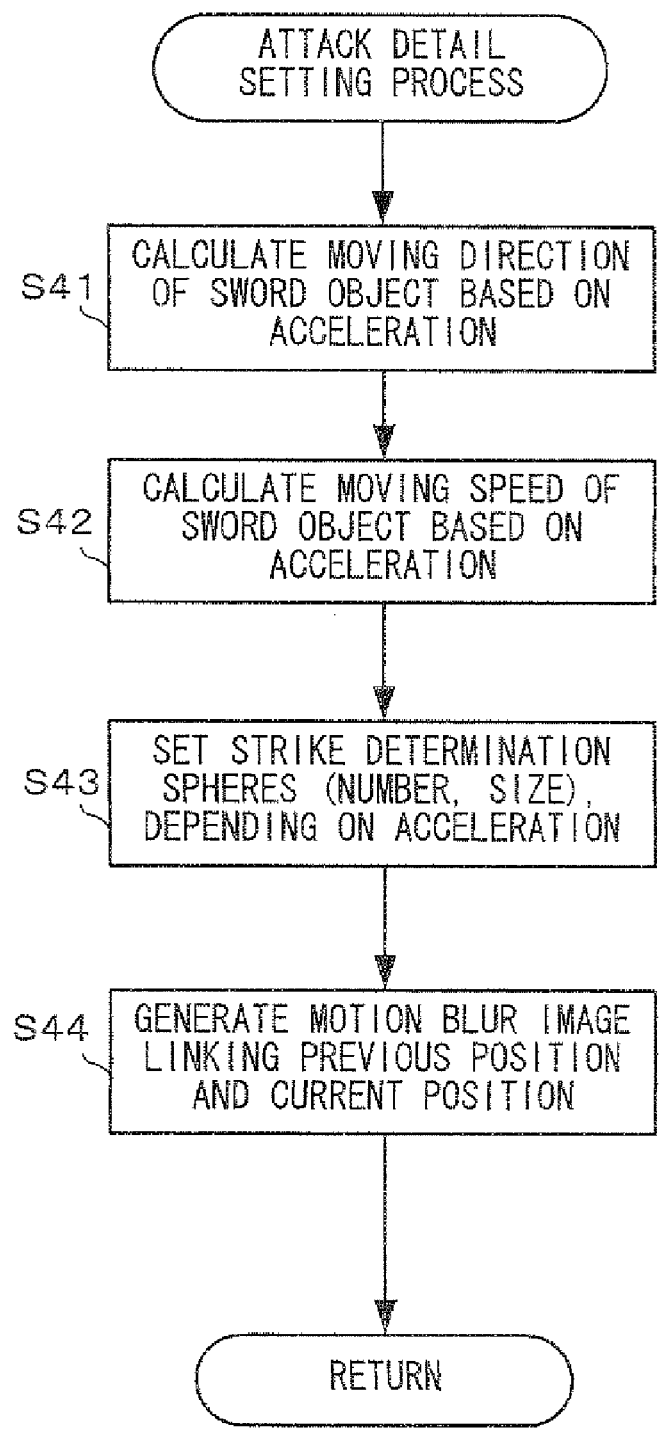
FIG. 26 is a flowchart showing an attack detail setting process of step S26 of FIG. 25 in detail.

Next, the CPU 10 executes an attack detail setting process for determining the moving direction and setting strike determination spheres of the sword object 104 (step S26). FIG. 26 is a flowchart showing the attack detail setting process of step S26 in detail. In FIG. 26, initially, the CPU 10 calculates the moving direction of the sword object 104 based on the acceleration data 1262, and stores the moving direction as the moving direction data 129 (step S41). Specifically, the CPU 10 determines in what direction the sword object 104 is to be moved, with reference to the local coordinate system.

Next, the CPU 10 determines the moving speed of the sword object 104 based on the acceleration data 1262, and stores the moving speed as the moving speed data 130 (step S42). For example, the CPU 10 sets a higher moving speed as the acceleration increases.

Next, the CPU 10 determines the size and number of the strike determination spheres 107 (see FIG. 16) based on the acceleration data 1262, and adds the strike determination spheres 107 to the sword object 104 (step S43). The CPU 10 also sets a value called an "attack power" to each strike determination sphere 107. This is a value based on which the level of damage on the enemy object 102 when the strike determination spheres 107 collide with the enemy object 102 or the like is calculated. For example, a table may be previously created and stored in which the magnitudes of accelerations, and the numbers, sizes and attack powers of strike determination spheres 107 are associated with each other. By looking up the table, the number, size and attack power of the strike determination spheres 107 are set.

Next, a motion blur effect image 105 (see FIG. 14) is generated that links a position in the virtual space of the previously drawn sword object 104 with a position of the current sword object 104 (step S44). Thus, the attack detail setting process is completed.

Referring back to FIG. 25, the CPU 10 executes a strike determining process, following step S26 (step S27). Specifically, the CPU 10 determines whether or not the strike determination spheres 107 set by the process of step S26 have collided with the enemy object 102 locked onto by the pointer lock operation or other objects. If the collision has occurred, various processes relating to a hit of the attack are executed (e.g., calculation of damage based on the attack power set for the strike determination spheres 107, etc.). Thereafter, the CPU 10 ends the ready process.

Figure 27:
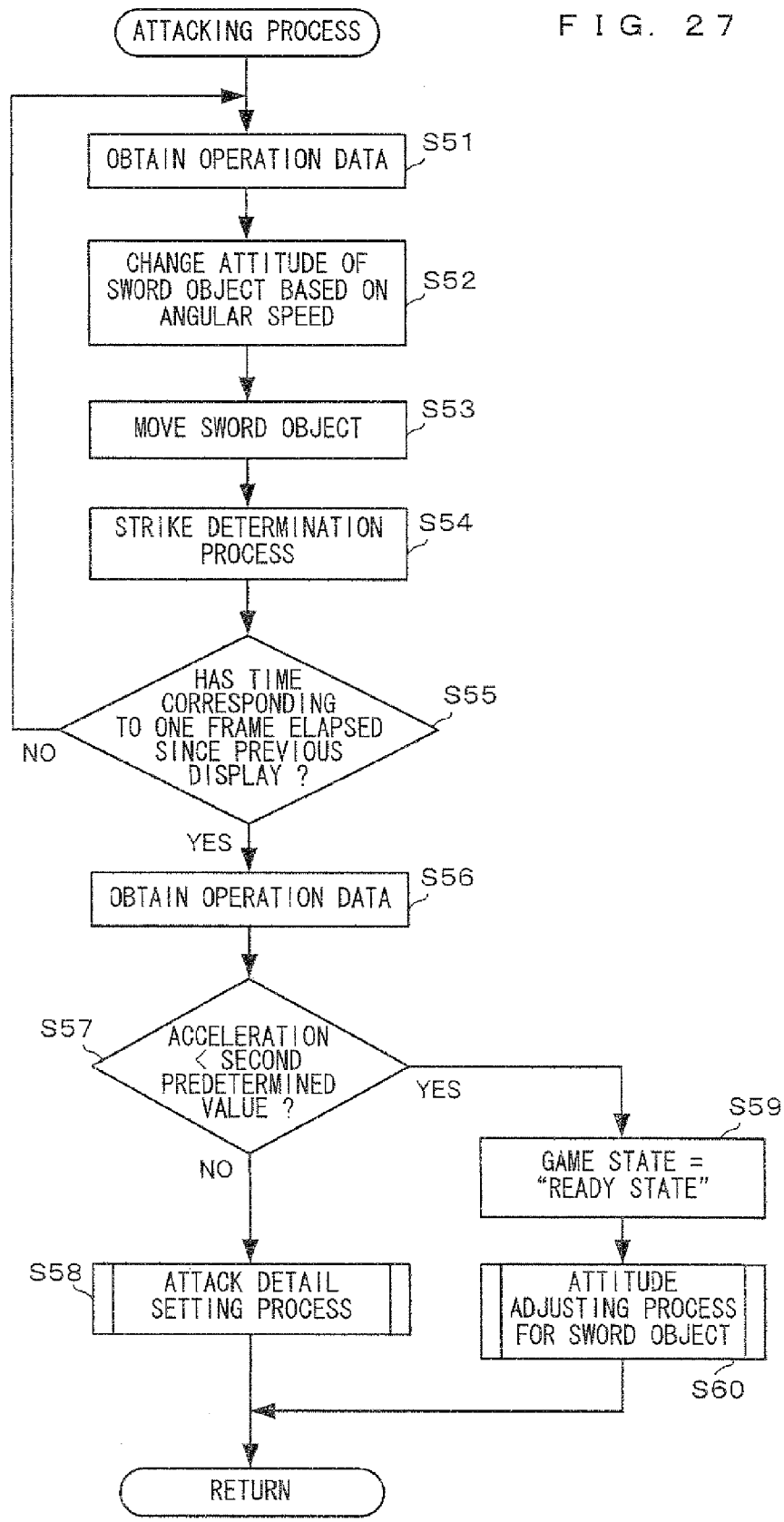
FIG. 27 is a flowchart showing an attacking process of step S12 of FIG. 24 in detail.

Next, the attacking process of step S12 of FIG. 24 will be described. FIG. 27 is a flowchart showing the attacking process of step S12 in detail. In FIG. 27, initially, the CPU 10 obtains the operation data 126 (step S51).

Next, the attitude of the sword object 104 is changed based on the angular speed data 1261 included in the operation data 126. For example, a rotation matrix indicating the amount of rotation of the attitude is calculated based on the angular speed data 1261. Thereafter, the attitude of the sword object 104 is changed based on the rotation matrix.

Next, the CPU 10 moves the sword object 104 based on the moving direction data 129 and the moving speed data 130 (step S53). In this example, the moving direction and the speed are determined for each frame. Therefore, in step S53, the sword object 104 may be moved in an amount corresponding to one frame for each frame, but not for each period during which the attitude is set. Although it is also assumed in this example that even if the attitude is changed, the moving direction and speed are not changed until the speed is set for each frame based on the acceleration in the world coordinate system, the moving direction can be changed every time the attitude is changed even when the moving direction and speed are set for each frame.

Next, the CPU 10 executes the strike determining process for the sword object 104 after the sword object 104 is moved (step S24). This process is similar to that of step S27 of FIG. 25 and therefore will not be described in detail.

Next, the CPU 10 determines whether or not a time corresponding to one frame, i.e., $\frac{1}{30}$ sec or $\frac{1}{60}$ sec, has elapsed since the display of the previous game screen (the previous process loop) (step S55). If the result of the determination indicates that the time corresponding to one frame has not elapsed (No in step S55), the CPU 10 goes back to step S51 and repeats the process of step S51. Here, as described above, operation data is transmitted from the controller 5 to the game apparatus 3 at a rate of once per 1/200 sec. The operation data 126 is also updated at this rate. Therefore, if the time corresponding to one frame is assumed to be 1/30 sec, the process loop of steps S51 to S55 is executed about six or seven times until the time corresponding to one frame has elapsed.

On the other hand, if the result of the determination in step S55 indicates that the time corresponding to one frame has elapsed (YES in step S55), then the CPU 10 executes a process for resetting the moving direction and the like of the sword object 104 based on the acceleration at the time. Specifically, the CPU 10 initially obtains the operation data 126 (step S56).

Next, the CPU 10 determines whether or not the magnitude of the acceleration indicated by the acceleration data 1262 included in the operation data is less than a second predetermined value (step S57). In other words, the CPU 10 determines whether or not conditions for ending the "attacking state" are satisfied. When the input device 8 is moved in the "attacking state", an acceleration is initially applied in a moving direction, and during the end of the motion, an acceleration having a direction opposite to the moving direction is applied so as to stop moving. After the motion is ended, the magnitude of the acceleration becomes small. Therefore, when the magnitude of the acceleration becomes small, the CPU 10 determines that the motion has been ended. Therefore, the CPU 10 may determine whether or not the motion has been ended, based on whether or not an acceleration having a small magnitude has been continued for a predetermined period of time. If the result of the determination indicates that the acceleration is not less than the second predetermined value (NO in step S57), the "attacking state" continues, and therefore, the CPU 10 executes an attack detail setting process (step S58). This process is similar to the process of step S26 of FIG. 25 and will not be described in detail. By this process, the moving direction and the strike determination spheres 107 of the sword object 104 are set based on an acceleration at that time.

On the other hand, if the result of the determination in step S57 indicates that the acceleration is less than the second predetermined value (YES in step S57), the CPU 10 ends the "attacking state", and executes a process for going to the "ready state". Specifically, the CPU 10 sets data indicating the "ready state" into the game state data 131 (step S59).

Next, the CPU 10 executes an attitude adjusting process for adjusting the attitude of the sword object 104 during the end of an attack (step S60). This is a process for adjusting the attitude of the sword object 104 during the end of the "attacking state" so as to prevent the attitude of the sword object 104 from appearing to be unnatural. After the end of this process, the CPU 10 ends the attacking process.

Figure 28:
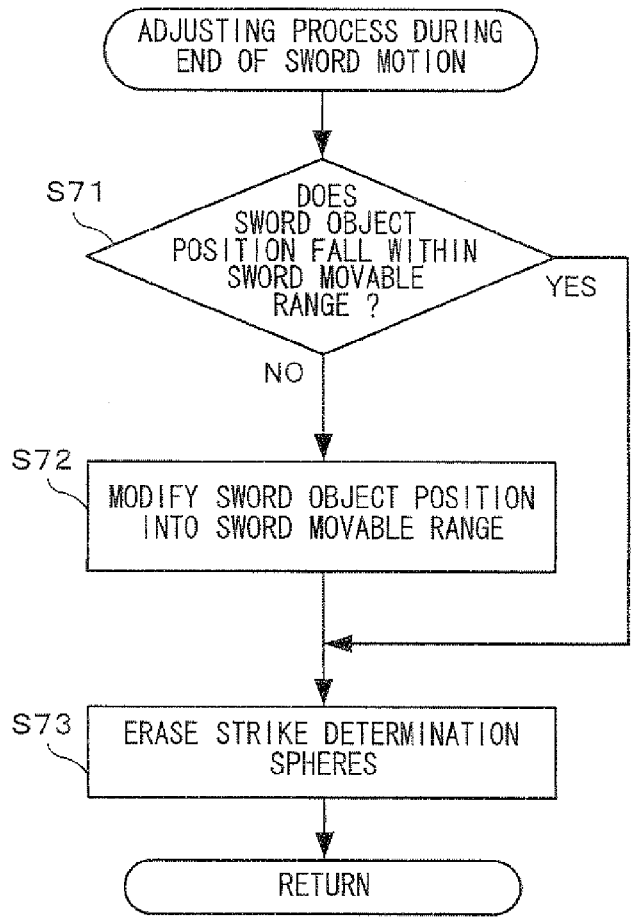
FIG. 28 is a flowchart showing an attitude adjusting process of a sword object of step S60 of FIG. 27 in detail.

FIG. 28 is a flowchart showing the attitude adjusting process for the sword object 104 in step S60 in detail. In FIG. 28, initially, the CPU 10 determines whether or not the position of the sword object 104 falls within the sword movable range (step S71). If the result of the determination indicates that the position of the sword object 104 does not fall within the sword movable range (NO in step S71), the CPU 10 changes the position of the sword object 104 so that it falls within the sword movable range (step S72). Thereafter, the CPU 10 erases the strike determination spheres 107 (step S73). On the other hand, if the result of the determination in step S71 indicates that the position of the sword object 104 falls within the sword movable range (YES in step S71), the CPU goes to the process of step S73 without executing the process of step S72. Thus, the attitude adjusting process is completed.

The game process of this embodiment has been thus described.

As described above, in this embodiment, when the attitude of the sword object 104 is controlled based on the angular speed in the "ready state", then if an acceleration having a predetermined value or more is detected, strike determination spheres for the sword object 104 are set and the moving direction and the like of the sword object 104 are determined before the "ready state" is changed to the "attacking state", so that an attack to the enemy object 104 or the like is allowed. Thereby, it is possible to provide a game having a novel operability that employs an acceleration sensor and a gyroscopic sensor.

Also, in the "attacking state", the moving direction and the moving speed of the sword object 104 are determined based on the acceleration, and the attitude of the sword object 104 is corrected based on the angular speed. Thereby, the motion of the input device 8 moved by the player can be more correctly reflected on the attitude and motion of the sword object 104.

Figure 29:
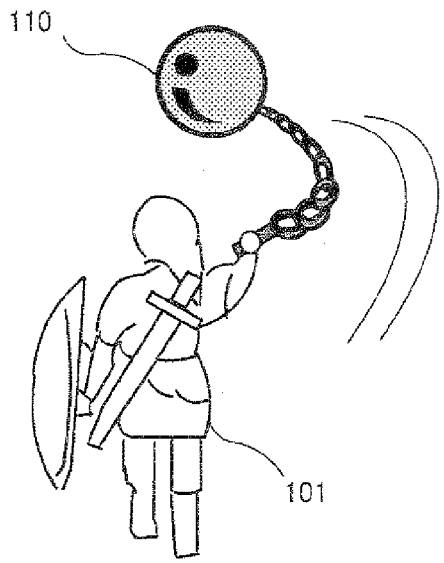
FIG. 29 is a diagram for describing a process using an acceleration in a z-axis direction.
Figure 30:
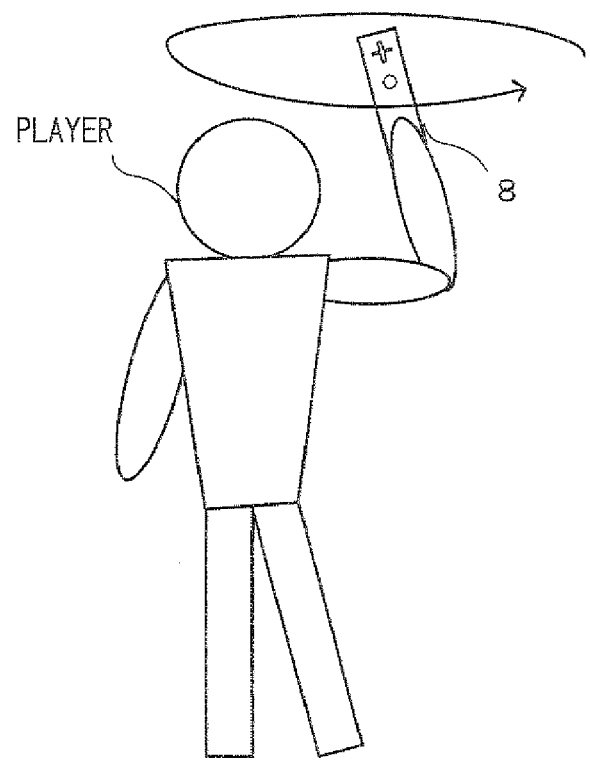
FIG. 30 is a diagram for describing a process using an acceleration in a z-axis direction.
Figure 31:
FIG. 31 is a diagram showing an exemplary trajectory.

Note that, in the above-described embodiment, it is determined whether or not the "ready state" is to be switched to the "attacking state", based on whether or not an acceleration larger than or equal to the first predetermined value has been generated. In this case, it is assumed in this embodiment that only accelerations along two axes, i.e., the x-axis and the y-axis, are used. The present invention is not limited to this. Three accelerations along the x-, y- and z-axes may be used for the determination. For example, as a weapon of the player object 101, an "iron sphere" 110 that can be swung around as shown in FIG. 29 is assumed. It is assumed that, as shown in FIG. 30, the player swings around the input device 8, and finally moves the input device 8 toward the front of the player, mimicking the motion of swinging around the "iron sphere" 110. When such a swinging motion is performed, an acceleration in the z-axis direction is continuously generated in the input device 8. Therefore, when an acceleration in the z-axis direction having a predetermined value or more is continuously detected, it is determined that the iron sphere 110 is being swung around. Thereafter, if a large change occurs in the acceleration in the z-axis direction (i.e., the input device 8 is moved toward the front), a strike determination sphere as described above is set for the iron sphere object 110 in the virtual game space, for example, and the iron sphere object 110 is moved based on the acceleration, so that the iron sphere object 110 is used to attack the enemy object 104 or the like.

Also, in the above-described embodiment, in the attack detail setting process, the number, size and attack power of strike determination spheres 107 are set, depending on the magnitude of the acceleration. In addition, other processes may be executed, depending on the magnitude of the acceleration. For example, a "sound effect representing sword swinging" may be output from the loudspeaker 49 of the controller 5, depending on the magnitude of the acceleration. Specifically, the "sound effect representing sword swinging" may be set to have a larger sound volume for a larger magnitude of the acceleration. Also, different tones may be used, depending on the magnitude of the acceleration. The controller 5 can generate a vibration by actuating the vibrator 48. Therefore, the controller 5 may generate a vibration having an intensity depending on the magnitude of the acceleration. Thereby, it is possible to enhance the sense of realism, thereby causing the game to be more enjoyable.

While the invention has been described in detail, the foregoing description is in all aspects illustrative and not restrictive. It is understood that numerous other modifications and variations can be devised without departing from the scope of the invention.

What is claimed is:

1. A game apparatus comprising:
an operation data obtaining unit for obtaining operation data including at least acceleration data and angular speed data from an input device including at least an acceleration sensor and a gyroscopic sensor;
a first control unit for controlling at least one of an attitude and a position of a predetermined object in a virtual space based on the angular speed data;
a first acceleration condition determining unit for determining whether or not the acceleration data satisfies predetermined conditions when at least one of the attitude and the position of the predetermined object is controlled by the first control unit;
a second control unit for causing the predetermined object to start a predetermined motion when the first acceleration condition determining unit determines that the acceleration data satisfies the predetermined conditions, the predetermined motion being a change of motion of the predetermined object from a first game state to a second game state; and
an attitude updating unit for updating the attitude of the predetermined object based on the angular speed data when the second control unit moves the predetermined object.

2. The game apparatus according to claim 1, wherein the second control unit causes the predetermined object to start the predetermined motion with reference to at least one of the attitude and the position of the predetermined object when the acceleration data satisfies the predetermined conditions.

3. The game apparatus according to claim 1, wherein the second control unit determines a moving direction of the predetermined object based on the acceleration data when it is determined that the acceleration data satisfies the predetermined conditions, and moves the predetermined object in the determined moving direction.

4. The game apparatus according to claim 1, wherein the first acceleration condition determining unit determines whether or not a magnitude of an acceleration indicated by the acceleration data is larger than a first predetermined value, and when the magnitude of the acceleration indicated by the acceleration data is larger than the first predetermined value, determines that the acceleration data satisfies the predetermined conditions.

5. A game apparatus comprising:
an operation data obtaining unit for obtaining operation data including at least acceleration data and angular speed data from an input device including at least an acceleration sensor and a gyroscopic sensor;
a first control unit for controlling at least one of an attitude and a position of a predetermined object in a virtual space based on the angular speed data;
a first acceleration condition determining unit for determining whether or not the acceleration data satisfies predetermined conditions when at least one of the attitude and the position of the predetermined object is controlled by the first control unit; and
a second control unit for causing the predetermined object to start a predetermined motion when the first acceleration condition determining unit determines that the acceleration data satisfies the predetermined conditions, the predetermined motion being a change of motion of the predetermined object from a first game state to a second game state, wherein
the second control unit includes a strike determination area setting unit for setting a strike determination area for determining whether or not the predetermined object collides with another object, when it is determined that the acceleration data satisfies the predetermined conditions.

6. The game apparatus according to claim 5, wherein the second control unit includes:
a second acceleration condition determining unit for determining whether or not the acceleration indicated by the acceleration data is smaller than a second predetermined value after the strike determination area setting unit sets the strike determination area; and
a strike determination area erasing unit for erasing the strike determination area when the second acceleration condition determining unit determines that the acceleration is smaller than the second predetermined value.

7. The game apparatus according to claim 5, wherein the strike determination area setting unit sets an effect provided when the strike determination area collides with the other object, based on the acceleration data.

8. A non-transitory computer-readable recording medium recording a game program for causing a computer of a game apparatus to execute functionality comprising:
obtaining operation data including at least acceleration data and angular speed data from an input device including at least an acceleration sensor and a gyroscopic sensor;
controlling at least one of an attitude and a position of a predetermined object in a virtual space based on the angular speed data;
determining whether or not the acceleration data satisfies predetermined conditions when at least one of the attitude and the position of the predetermined object is controlled;
causing the predetermined object to start a predetermined motion when it is determined that the acceleration data satisfies the predetermined conditions, the predetermined motion being a change of motion of the predetermined object from a first game state to a second game state; and
updating the attitude of the predetermined object based on the angular speed data when the predetermined object is moved.

9. The non-transitory computer-readable recording medium according to claim 8, wherein
the predetermined object starts the predetermined motion with reference to at least one of the attitude and the position of the predetermined object when the acceleration data satisfies the predetermined conditions.

10. The non-transitory computer-readable recording medium according to claim 8, wherein
a moving direction of the predetermined object is determined based on the acceleration data when it is determined that the acceleration data satisfies the predetermined conditions, and the predetermined object is moved in the determined moving direction.

11. The non-transitory computer-readable recording medium according to claim 8, wherein
whether or not a magnitude of an acceleration indicated by the acceleration data is larger than a first predetermined value is determined, and when the magnitude of the acceleration indicated by the acceleration data is larger than the first predetermined value, the acceleration data is determined to satisfy the predetermined conditions.

12. A non-transitory computer-readable recording medium recording a game program for causing a computer of a game apparatus to execute functionality comprising:

obtaining operation data including at least acceleration data and angular speed data from an input device including at least an acceleration sensor and a gyroscopic sensor;

controlling at least one of an attitude and a position of a predetermined object in a virtual space based on the angular speed data;

determining whether or not the acceleration data satisfies predetermined conditions when at least one of the attitude and the position of the predetermined object is controlled; and causing the predetermined object to start a predetermined motion when it is determined that the acceleration data satisfies the predetermined conditions, the predetermined motion being a change of motion of the predetermined object from a first game state to a second game state, wherein the program causes the computer to further execute functionality comprising setting a strike determination area for determining whether or not the predetermined object collides with another object, when it is determined that the acceleration data satisfies the predetermined conditions.

13. The non-transitory computer-readable recording medium according to claim 12, wherein the program causes the computer to further execute:

determining whether or not the acceleration indicated by the acceleration data is smaller than a second predetermined value after the strike determination area is set; and erasing the strike determination area when it is determined that the acceleration is smaller than the second predetermined value.

14. The non-transitory computer-readable recording medium according to claim 12, wherein an effect provided when the strike determination area collides with the other object is set based on the acceleration data.

* * * * *